(12) United States Patent
Becker et al.

(10) Patent No.: US 8,416,744 B2
(45) Date of Patent: Apr. 9, 2013

(54) MANAGEMENT OF MOBILE TERMINALS IN A COMMUNICATION SYSTEM ALLOWING FOR MULTIPLE-TRACKING AREA REGISTRATION

(75) Inventors: Ralf Becker, Neu-Isenburg (DE); Osvaldo Gonsa, Frankfurt (DE)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/594,419

(22) PCT Filed: Jan. 22, 2008

(86) PCT No.: PCT/EP2008/000473
§ 371 (c)(1),
(2), (4) Date: Nov. 17, 2009

(87) PCT Pub. No.: WO2008/122323
PCT Pub. Date: Oct. 16, 2008

(65) Prior Publication Data
US 2010/0061308 A1    Mar. 11, 2010

(30) Foreign Application Priority Data

Apr. 5, 2007   (EP) .................................... 07007224

(51) Int. Cl.
*H04W 4/00*        (2009.01)
*H04W 36/00*       (2009.01)
(52) U.S. Cl.
USPC ............................ 370/331; 370/328; 455/436
(58) Field of Classification Search ................... 370/331
See application file for complete search history.

(56) References Cited

U.S. PATENT DOCUMENTS

| | | | |
|---|---|---|---|
| 7,986,677 B2 * | 7/2011 | Park et al. | 370/338 |
| 2007/0218905 A1 * | 9/2007 | Lee | 455/436 |
| 2008/0037515 A1 * | 2/2008 | Sander | 370/352 |
| 2009/0122727 A1 * | 5/2009 | Gan et al. | 370/259 |

OTHER PUBLICATIONS

International Search Report dated Oct. 7, 2008.
3GPP TR 25.912 V7.0.0, (Jun. 2006); Technical Specification Group Radio Access Network; Feasibility study for evolved Universal Terrestrial Radio Access (UTRA) and Universal Terrestrial Radio Access-Network (UTRAN), (Release 7), Jun. 2006, pp. 1-57.

(Continued)

*Primary Examiner* — Brandon Renner
*Assistant Examiner* — Shaq Taha
(74) *Attorney, Agent, or Firm* — Dickinson Wright PLLC

(57) ABSTRACT

The invention relates to a method and network control node for detecting the point of attachment of mobile terminals moving within a mobile communication network in idle mode, wherein the mobile communication system can be logically divided into plural tracking areas to which the mobile terminals register. Further, the invention relates to a method for enabling management of mobile terminals in idle mode receiving a service within such mobile communication system. Moreover, the invention relates to a method and mobile terminal for updating the mobile terminal's tracking area registration in a mobile communication system being logically divided into plural tracking areas, wherein mobile terminal is in idle mode and is registered to plural tracking areas simultaneously. The invention suggests different mechanism how to detect terminals registering to plural tracking area, how to verify their current location in the network and how to use these information, for example for resource management.

20 Claims, 7 Drawing Sheets

OTHER PUBLICATIONS

3GPP TR 23.882, V1.8.0 (Feb. 2007), 3rd Generation Partnership Project; Technical Specification Group Services and System Aspects; 3GPP System Architecture Evolution: Report on Technical Options and Conclusions, (Release 7), Feb. 2007, pp. 1-187.

Technical Specification Group Radio Access Network; 3GPP TR R3.018 V0.7.0: Evolved UTRA and UTRAN; Radio Access Architecture and Interfaces (Release 7), 3rd Generation Partnership Project, (Oct. 2006), XP002416232, Oct. 2006, pp. 1-138.

3GPP TR 25.813 V7.1.0 (Sep. 2006), Technical Report, 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects, (Release 7), Sep. 2006, pp. 1-41.

3GPP TS 25.331 V7.3.0 (Dec. 2006), Technical Specification, 3rd Generation Partnership Project; Technical Specification Group Radio Access Network; Radio Resource Control (RRC); Protocol Specification (Release 7), Dec. 2006, pp. 1-1316.

3GPP TS 25.346 V7.2.0 (Sep. 2006), Technical Specification, 3rd Generation Partnership Project; Technical Specification Group Radio Access Network; Introduction of the Multimedia Broadcast Multicast Service (MBMS) in the Radio Access Network (RAN); Stage 2 (Release 7), Sep. 2006, pp. 1-60.

ETSI TS 125 346 V7.2.0 (Sep. 2006), Universal Mobile Telecommunications System (UMTS); Introduction of the Multimedia Broadcast/Multicast Service (MBMS) in the Radio Access Network (RAN); Stage 2, (3GPP TS 25.346 version 7.2.0 Release 7) Sep. 2006, pp. 1-61.

* cited by examiner

MANAGEMENT OF MOBILE TERMINALS IN A COMMUNICATION SYSTEM ALLOWING FOR MULTIPLE-TRACKING AREA REGISTRATION

FIELD OF THE INVENTION

The invention relates to a method and network control node for detecting the point of attachment of mobile terminals moving within a mobile communication network in idle mode, wherein the mobile communication system can be logically divided into plural tracking areas to which the mobile terminals register. Further, the invention relates to a method for enabling management of mobile terminals in idle mode receiving a service within such mobile communication system. Moreover, the invention relates to a method and mobile terminal for updating the mobile terminal's tracking area registration in a mobile communication system being logically divided into plural tracking areas, wherein mobile terminal is in idle mode and is registered to plural tracking areas simultaneously.

TECHNICAL BACKGROUND

For mobile communications systems it is generally required that a mobile terminal first attaches to/registers with the network before being able to receive desired services. This attachment/registration usually comprises authentication and authorization of the mobile terminal in the network and is often referred to as "network attachment". For each mobile terminal attaching/registering with the network context state information and signaling messages are generated at the network entity handling the network attach. So obviously each mobile terminal creates some load at this entity. Of course there is an upper bound for the load a specific network entity can process, resulting in an upper bound regarding the number of mobile terminals such an entity can handle. Therefore, it might be required to spread the load caused by the mobile terminals across several network entities.

Generally mobile communications systems can be split into logically separated parts providing dedicated functionalities. These parts are usually called core network (CN) and access network (AN) with several access nodes. Particularly for wireless mobile communications systems the latter part is usually referred to as radio access network (RAN).

Typically the network entities handling the network attach functionality are located in the core network of the mobile communications system. Entities in the radio access network and core network utilize defined interfaces to communicate between each other. In order to allow a distribution of the load caused by the mobile terminals across several core network entities, each radio access network entity handling the radio connection with the mobile terminal has to have a relation (i.e. interface) to a plurality of core network entities. As there are several radio access network entities deployed in a mobile communications system, this results in a many-to-many relation between the core network entities and the radio access network entities (see for example 3GPP TR 25.912, "Feasibility study for evolved Universal Terrestrial Radio Access (UTRA) and Universal Terrestrial Radio Access Network (UTRAN)", version 7.0.0, incorporated herein by reference).

Traditionally (also in the currently discussed 3GPP SAE/LTE systems, see for example 3GPP TR 23.882 "3GPP System Architecture Evolution: Report on Technical Options and Conclusions", version 1.8.0, February 2007 (incorporated herein by reference) the cellular networks are split into a control plane (also denoted C-plane) handling all control information and procedures and a user plane (also denoted U-Plane) handling the actual user data traffic, which also applies for the multicast architecture.

It may be assumed for exemplary purposes that the multicast control plane can be handled by all core network control plane entities, which are assigned to the mobile terminals during network attachment or mobility.

FIG. 1 shows an exemplary overview of an heterogeneous communication system, a part of which is a 2G/3G system and the other part being a 4G or SAE/LTE system. With reference to FIG. 1 the basic structure of SAE/LTE system will be described in further detail.

In a SAE/LTE system, the Mobility Management Entity (MME) 105 may be assumed to perform the core network control plane functionality, including mobility management. Some or all MMEs in a SAE/LTE system may also contain multicast management functionality and may be referred to as a Multicast-MME (M-MME).

On the other hand, for the SAE/LTE system the core network user plane functionality is contained in the User Plane Entity (UPE) 106. UPEs that are provided with user plane functionality for a multicast service may be referred to as a Multicast-UPE (M-UPE), if it is selected by an M-MME to handle the multicast service data in the SAE/LTE system.

Further in a SAE/LTE system, the Inter Access System Anchor (IASA) 109 may be assumed to anchor the user plane for mobility between the 2G/3G access system and the LTE access system. It therefore interfaces on the one hand to the entities of the SAE/LTE system like MME 106 and UPE 107 and on the other hand to the entities of the 2G/3G system like SGSN 102. For the latter the IASA, being part of the SAE/LTE system, may act like a GGSN. Further, the IASA may be assumed to provide access external networks, for example an operator's service network containing the BM-SC 101.

All entities mentioned above are considered to be logic entities providing specific functionality. These entities may be combined or separated in different nodes. For example the function of IASA providing access to external networks might be referred to as PDN SAE GW, while the function providing mobility anchor between 2G/3G access systems and LTE access systems might be referred to as Serving SAE GW. It might be further possible that the UPE 107 functionality is also comprised in Serving SAE GW.

Mobility Support and Operational States of Mobile Terminals

One important aspect for mobile communications in cellular networks is the optimized utilization of resources. This includes most importantly radio and network resources but also comprises mobile terminal resources like battery consumption. Several dedicated procedures and solutions exist to optimize this aspect. Usually cellular networks support different activity states of the mobile terminal, typically called active and idle mode (or state). There might even exist further sub-states. Each state poses different requirements to the system, e.g. different mobility mechanisms are applied, resulting in different utilization of resources.

For example a mobile terminal would transit to an active state, when it is engaged in an active communication session, i.e. is currently sending and/or receiving information. In UMTS systems a mobile terminal is said to be in active state if it maintains an RRC (Radio Resource Control) connection to the access network.

In active state the mobile terminal is usually known on a radio cell level by the network. Accordingly, each time the current cell of a terminal changes the mobile terminal will update its location in the network. This enables fast mobility procedures supporting highly mobile terminals while reducing (eliminating) losses caused by the mobility.

However, in order to achieve this, a lot of signaling messages have to be exchanged between the mobile terminal and the network and also within the network. Apparently this consumes considerable resources on the air interface, in the network and also in the mobile terminal.

Because of the above, when the mobile terminal currently does not maintain active communication channels, it might transit to an idle state, which is used in order to reduce the consumed resources. In this state the mobile terminal is usually only known on a larger area possibly comprising several cells, typically called routing area (RA), location area (LA) or tracking area (TA)—please note that these terms are considered interchangeable herein. Only when the current area of a terminal changes, it is required to update its location in the network. Further, only entities in the core network (CN) might be aware of the mobile terminal and mobility might be performed transparently to the entities of the radio access network (RAN). For example in 3G systems the mobile terminal is only known on the routing area/tracking area/location area-level when in idle state. For the currently developed SAE/LTE systems the mobile terminal's location in idle state is for example only known to the core network nodes implementing the MME.

In comparison to the active state, the idle state involves less signaling messages and location updates occur less frequently, therefore reducing the consumed resources on the air interface, in the network and also in the mobile terminal.

One concept in the development of 3GPP-based systems is the concept of having tracking areas (TAs). The target of this concept is to limit the amount of signaling (e.g. resulting from mobility) and required context information stored in the network for user equipments in the so-called idle state (or idle mode). The tracking area comprises a number of access nodes (base stations), within which the mobile terminals in idle states can move without the need to update their location at the core network entities. In 3GPP TR R3.018 "Evolved UTRA and UTRAN; Radio Access Architecture and Interfaces", version 0.7.0 (incorporated herein by reference) two alternative tracking area concepts exist: overlapping tracking area and multi-tracking registration.

Regarding overlapping tracking areas an access node of the radio access network (e.g. eNodeB) is assigned to one or more tracking areas, i.e. might broadcast multiple tracking area identifiers (TA-IDs) in its cells. Using this concept a mobile terminal is always assigned to a single tracking area. The mobile terminal may update its location at the core network entities only in case it selects an eNodeB that does not broadcast its current TA-ID.

Regarding multi-TA registration an eNodeB is always assigned to a single tracking area, i.e. broadcasts only a single TA-ID in its cells. Using this concept a mobile terminal could be assigned to multiple tracking areas in parallel. In this case the mobile terminal updates its location at the core network entities, when it selects an eNodeB that does not broadcast any of the TA-IDs the mobile terminal is currently assigned to.

The typical mobility procedures used in the idle state are based on the mobile terminal, e.g. cell selection or cell reselection. That is the mobile terminal decides, e.g. based on strength of received radio signal, which cell it selects, i.e. to which cell it tunes its receiver. As the tracking areas used in the idle state might span over several radio cells, a mobile terminal could be located at the edge of such an area, i.e. close to the border of one or more different areas. In such a case it might happen that due to changing radio conditions a mobile terminal might frequently select a cell belonging to a different area. Apparently this would also result in frequently required location updates of the terminal, alleviating the resource savings achieved by the idle state.

Above described conditions can occur in several situations. One example, described previously, is that a mobile terminal is located at the border of an idle state mobility area, e.g. routing area or tracking area. A similar situation might arise for a dual-mode terminal that switches based on radio conditions between different supported radio access technologies (RATs). For example considering a cellular communication system as standardised in 3GPP, an operator could deploy in addition to existing UMTS (2G and 3G systems) coverage cells utilizing an SAE/LTE compliant radio access (referred to as 4G or LTE systems), resulting in overlapping coverage of both radio access technologies. In such a scenario, a UMTS/LTE dual-mode terminal might select based on radio reception conditions either a UMTS cell or a LTE cell. As different network (control) entities are responsible for handling the mobile terminal depending on the utilised radio access technology, a location update is required each time the UE selects a cell of a different radio access technology.

Several options exist how to cope with this problem described above. One option is to establish some kind of hysteresis in order to reduce the occasions where a location update is required. For example this could be achieved by deploying overlapping idle state mobility areas. In this option a single cell might belong to multiple areas. Once a mobile terminal selected a cell of a different area its location is updated. If the mobile terminal subsequently selects the previous cell again no further location update is required, as this cell would also belong to the current idle state mobility area of the terminal. Another option is to allow the mobile terminal to be registered to multiple areas simultaneously. Only when it moves to an area that it is currently not registered to, a update of the mobile terminal's location would be required.

The latter concept can also be applied to the overlapping radio access technology coverage scenario discussed above. For example, as discussed in 3GPP TR 23.882, a mobile terminal in idle state might be registered to different tracking areas of UTRAN and E-UTRAN simultaneously. As long as it does not change its assigned routing area or tracking area, the terminal might move between the systems without any signaling to the network.

MBMS Service Provision in Heterogeneous Networks

Assuming a cellular communication system as specified in 3GPP comprising several radio access technologies (heterogeneous network), e.g, UTRAN (2G/3G) and E-UTRAN (SAE/LTE), it might apply above-mentioned concept to limit required signaling of a mobile terminal in idle state that is transiting between the different radio access technologies. As mentioned before, in each radio access technology different network (control) entities are responsible for handling the terminal. When the terminal is present in an access network, e.g. E-UTRAN, the respective network (control) entity maintains some context information for that terminal. In a normal case, when the terminal is no longer present, e.g. because it moved to a different access network, this context information would be deleted. However, assuming utilization of this concept for limiting required idle mode signaling, even when the terminal is no longer present in the access system, its context information might still be maintained by the responsible network (control) entity. As described in 3GPP TR 25.813 "Evolved Universal Terrestrial Radio Access (E-UTRA) and Evolved Universal Terrestrial Radio Access Network (E-UTRAN); Radio interface protocol aspects", version 7.1.0, September 2006 (incorporated herein by reference), same applies to the context information maintained in the mobile terminal itself. Here the configuration used in the previous radio access technology might be stored as part of the context information established in the new radio access technology.

A mobile terminal in idle state does not maintain any communication channels with the network and it might handle mobility by its own without any signaling. Of course this may lead to error conditions where the network assumes the presence of the mobile terminal in its network while it is actually no longer there. This might happen when, for example, the terminal goes out of radio coverage or due to some terminal failure, e.g. empty battery. In order to avoid such situations, typically some timers are used in the network and in the terminals. Before expiration of a timer the mobile terminal is required to update its location, even if it has not moved at all. This procedure is usually called periodic location update. In case the timer would expire without a location update from the UE, the network assumes that the UE is no longer present and deletes corresponding context information. Same applies to the mobile terminal. Also here the context information is no longer valid when no successful location update was performed before expiration of the timer. Typically the values of such periodic update timers are in the order of minutes, for example in UTRAN the default value is 30 minutes (see 3GPP, TS 25.331 "Radio Resource Control (RRC); Protocol Specification", chapter 10.3.3.43, version 7.3.0, December 2006 (incorporated herein by reference).

With respect to above-mentioned concept for limiting the required idle mode signaling this means that a network (control) entity handling a mobile terminal in idle state might maintain corresponding context information even when the terminal is no longer present in the respective access network, until the periodic update timer expires, which could be in the order of minutes. Regarding unicast services this does not pose a problem, as a mobile terminal in idle state does not maintain active communication, i.e. no data is currently sent or received in the unicast service. However, for multicast services the situation might be different. For example considering MBMS services as specified in 3GPP, service reception for terminals in idle state is required as outlined in 3GP, 25.346 "Introduction of the Multimedia Broadcast Multicast Service (MBMS) in the Radio Access Network (RAN); Stage 2", version 7.2.0, September 2006 (incorporated herein by reference). This means that there might be an active communication channel, at least in the downlink direction, maintained even in case only terminals in idle state are present.

Assuming a multicast service distributed in cellular communication system as specified in 3GPP comprising several radio access technologies, e.g. UTRAN and E-UTRAN, the following scenario could exist, which is also depicted in FIG. 2. A mobile terminal 105 that previously has activated 201 the multicast service is transiting to idle state in it current access network. The context information maintained by the responsible network (control) entity additionally comprises information about the activated multicast service. In this state the terminal changes the access system, e.g. selects an E-UTRAN cell while previously using an UTRAN cell. In case this change of radio access technology happens for the first time, the terminal has to register 202 in the new access system, e.g. by sending a tracking area update (that comprises an identification of the old UTRAN tracking area TA $ID_{2G/3G}$), which will also cause transfer 203 of corresponding context information from the old network (control) entity (SGSN 102) to the current responsible one (MME 105). In case the multicast service is currently not being provided the new radio access technology, the new network control entity registers 204 for receiving the service at IASA 109 and finally the multicast U-plane is established 205 in the new radio access technology so that the service is also provided 206 therein.

When utilizing the concept of limited signaling for idle mode mobility, subsequently the mobile terminal might move between the different access systems without any signaling to the network, as long as the service is provided in the target cell and it belongs to current registered mobility area in the respective access system.

While in above scenario reception of the multicast service at the mobile terminal is possible independent of the currently selected access system, it might lead to inefficient utilization of network and radio resources. In case the mobile terminal remains camped on target access system, for example E-UTRAN, corresponding context in the network control entity handling the terminal in the other access system, e.g. UTRAN, remains valid until the periodic update timer expires or the terminal moves to a different mobility area in target system. As mentioned above the periodic update timer typically is in the order of minutes, i.e. if the terminal remains stationary (or at least within the assigned mobility area), its context in the old access system will remain valid for a possibly long time. In case the terminal was the only one in the old access system or when other terminals in the old system are leaving the service, e.g. due to mobility, the multicast service will constantly be provided until the periodic update time expires. This would of course unnecessarily consume network and particularly radio resources. This is especially wasteful for access systems where multicast transmissions consume much of the radio capacity, like it is the case in UTRAN.

Though in the examples of FIG. 1 and FIG. 2 above a heterogeneous network has been assumed essentially the same considerations apply in homogenous networks where a single radio access technology is utilized (e.g. mobile terminals in idle mode and receiving an MBMS service in a SAE/LTE system while moving through different tracking areas without deregistration from their respective previous tracking area).

As has been outlined above there are several potential problems and demands when mobile terminal mobility is provided for idle mode which are even worse if mobile terminals may register to multiple tracking areas simultaneously:

Network control entities might be unaware that a mobile terminal in idle state for which they maintain a valid context is no longer present in their access system As long as the mobile terminal does not change registered routing area/tracking area, the currently selected access system might be unknown to the network Signaling required for mobility idle state has to be limited as much as possible

SUMMARY OF THE INVENTION

One object of the invention is to enable the management of mobile terminals capable of registering to multiple tracking areas simultaneously. Another object is to overcome at least one of the above mentioned problems.

At least one of these objects is solved by the subject matter of the independent claims. Advantageous embodiments are subject to the dependent claims.

One aspect of the invention is the provision of a mechanism for enabling the management of mobile terminals in idle mode receiving a service within a mobile communication system being logically divided into plural tracking areas. According to this mechanism, mobile terminals that move through the network in idle mode and are simultaneously registered to more than one tracking area are detected and marked. Generally, it is assumed that mobile terminals registered to plural tracking areas simultaneously do not need to update their location by means of signalling as long as they move within the tracking areas in which they are registered, e.g. as long as they receive a tracking area identifier from the radio access network they are currently attached to that corresponds to a tracking area for which they have previously registered.

The marking of the mobile terminal may for example be made by means of setting a marker, such as for example a flag, in context information of the respective marked mobile terminal maintained in a network control entity. Alternatively, other context information maintained in a network control entity—such as for example a multicast or broadcast service related context—may be supplemented with a list of tracking areas (or list of corresponding tracking area identifiers) that have been indicated in tracking area updates as the previous tracking area of the respective mobile terminal sending the tracking area update. The list could be maintained for each service (e.g. multicast or broadcast service) or as a general list independent of a particular service. Based on this list, the network control entity can recognize whether mobile terminals may have registered to other tracking areas than that of the network entity in general or for a particular service.

One example for detecting mobile terminals that have registered or are registering to more than one tracking area may be the reception of a tracking area update at a network control entity. It may be assumed for exemplary purposes that tracking area updates indicate the tracking area to which the respective mobile terminals have been attached prior to switching their point of attachment to the radio access network belonging to the network control entity's controlled tracking area. Accordingly, the network control entity receiving the tracking area update may evaluate the tracking area update message and may update (service related) context information accordingly as indicated above.

Another aspect of the invention is the confirmation of the point of attachment of mobile terminals that have been previously marked or of terminals in the tracking area of a network control entity. This confirmation (or verification) may be done generally for all mobile terminals in the tracking area or for marked mobile terminals only. Further, the confirmation may be obtained on a per service basis or generally—depending on how the context information is maintained (see above). In order to verify which (marked) mobile terminals in idle mode are attached to the network entity controlling a particular tracking area (in general or for one or more particular services), one exemplary implementation foresees the transmission of a notification to the mobile terminals so as to request the desired subset of terminal (e.g. the marked terminal only) in the particular tracking area to respond with sending an indication of their respective current point of attachment to the network control entity.

The attachment indication of the mobile terminals may be for example sent in form of a tracking area update indicating the current tracking area controlled by the network control entity as the "old" tracking area. This tracking area update may be considered a verification of the respective mobile terminal's point of attachment and/or deregistration from its other tracking areas to which it has registered in the past. The attachment notification may be sent by the mobile terminals autonomously or in response to a trigger (such as the notification to indicate the point of attachment). Different exemplary mechanisms according to various exemplary embodiments of the invention will be described herein.

One exemplary embodiment of the invention is related to a method for detecting the point of attachment of mobile terminals moving within a mobile communication network in idle mode. As indicated previously, it is assumed that the mobile communication system can be logically divided into plural tracking areas to which the mobile terminals register. A first network control entity may maintain context information for the respective mobile terminals in idle mode served by the first network control entity or for a particular service provided in the tracking area of the first network control entity. If context information is maintained for a respective mobile terminal it may comprise a marker that, when set, indicates that the respective mobile terminal has simultaneously registered to another tracking area than that controlled by the first network control entity. Further, a notification for verifying the current point of attachment of the marked mobile terminals may be transmitted, and the first network control entity may receive information indicative of whether at least one marked mobile terminal in idle mode is currently attached to a radio access network within the tracking area controlled by the first network control entity.

In one variation, the notification is transmitted by the first network control entity through a radio access network of the tracking area controlled by the first network control entity. In addition thereto or alternatively, a second network control entity may be requested to transmit the notification through its attached radio access network in the tracking area controlled by the second network control entity. The second network control should thereby control another tracking area to which at least one marked mobile terminal has registered in addition to the tracking area controlled by the first network control entity. For example, the second network control is identified by the maintained context information.

In a further embodiment of the invention, the notification is broadcast in the tracking area controlled by the first network control entity and/or in at least one other tracking area each controlled by respective other network control entity. Thereby, the notification may be for example broadcast as part of system information broadcast in the individual radio cells of the radio access network supervised by the first network control entity and/or said at least one other network control entity. In one exemplary further variation of the notification indicates the tracking area to which the broadcasting radio cell belongs and at least one other tracking area to which the marked mobile terminals in idle mode have registered.

According to another embodiment of the invention the marked mobile terminals respond to a common temporary, semi-static or static identifier and the notification is sent to the common identifier. In an exemplary variation the notification could be sent in form of a paging message. Alternatively, in another embodiment of the invention the notification is sent in form of plural paging messages individually addressed to the respective marked mobile terminals.

One exemplary embodiment considers a situation, where the mobile terminals have registered to a multicast or broadcast service such as an MBMS service. The mobile terminals may be marked within the context related to this multicast or broadcast service (e.g. the marker may be added to the MBMS UE context). In this exemplary embodiment the notification is transmitted to the marked mobile terminal as part of a counting procedure for counting the mobile terminals in the cell that receive said service. Thereby the notification may be only addressed to the marked mobile terminals, i.e. marked mobile terminals that have registered to the MBMS service.

In a further embodiment, the mobile terminals receiving the notification may optionally first evaluate based on the content of the notification whether to respond to the notification or not. Accordingly, at least one marked mobile terminal having received the notification may transmit an attachment indication to the network control entity controlling the tracking area to which the respective marked mobile terminal is currently attached. This attachment indication may for example indicate the tracking area to which the respective marked mobile terminal is currently attached. In one exemplary embodiment, the attachment indication is a tracking area update message sent by the at least one marked mobile terminal having received the notification to the network control entity controlling the tracking area to which the respective marked mobile terminal is currently attached. As indicated previously, this tracking area update message indicates the current tracking area to which the respective marked mobile terminal is currently attached.

In another embodiment of the invention, the information indicative of whether at least one marked mobile terminal in idle mode is currently attached to a radio access network within the tracking area controlled by the first network control entity comprises the information of the attachment notifications sent by the marked mobile terminals.

Moreover, in further embodiment of the invention, the information indicative of whether at least one marked mobile terminal in idle mode is currently attached to a radio access network within the tracking area controlled by the first network control entity could be partly or entirely received from at least one other network control entity controlling another tracking area to which at least one of the marked mobile terminals is further registered. In a variation of this embodiment, the notification may be transmitted through a respective access network of the at least one other tracking area controlled by the at least one other network control entity.

Other embodiments of the invention relate to the aspect of controlling the signalling load imposed by the notification. For example, in one example, the notification could indicate a probability value for determining a back-off time for delaying the response of mobile terminals to the notification. In another embodiment the notification could additionally or alternatively indicate a back-off factor for selecting only a subset of the terminal to respond to the notification.

Another embodiment of the invention considers the utilization of the knowledge of the actual point of attachment of the mobile terminals in controlling utilization of network resources (e.g. for a particular service. According to this embodiment, network resources reserved for a multicast or broadcast service provided to the marked mobile terminals may be freed in response to the information indicative of whether at least one marked mobile terminal in idle mode is currently attached to a radio access network within the tracking area controlled by the first network control entity. The network resources, may be for example freed in response to taking further into account service constraints (such as QoS constraints) of the multicast or broadcast service.

Moreover, concerning the aspect of enabling the management of mobile terminals in idle mode, another embodiment of the invention pertains to a method for enabling the management of mobile terminals in idle mode receiving a service within a mobile communication system being logically divided into plural tracking areas. According to this method the a tracking area update message may be received from a mobile terminal at a first network control entity to register the mobile terminal in a tracking area controlled by said first network control entity. The first network control entity may identify (based on the tracking area update message) a second network control entity controlling a tracking area to which the mobile terminal has previously registered, and may inform the second network control entity on the reception of the tracking area update message from the mobile terminal. Both, the first and second network control entity may mark the mobile terminal in mobile terminal related context information.

In a variation of the embodiment, the first network control entity could maintain context information for the respective mobile terminals in idle mode served by the first network control entity. This context information for a respective mobile terminal may for example comprise a marker that, when set, indicates that the respective mobile terminal has simultaneously registered to another tracking area than that controlled by the first network control entity. Moreover, the context information of a marked mobile terminal may for example indicate the at least one tracking area to which the respective marked mobile terminal is further registered or an identifier of the network control entity controlling the at least one tracking area to which the respective marked mobile terminal is further registered.

In a further embodiment of the invention (also) the second network control entity could maintain such context information for the respective mobile terminals in idle mode served by the second network control entity. In a variation, the at least one tracking area to which the respective marked mobile terminal is further registered or said identifier is derived by the second network control entity from the information received from the first network control entity Another embodiment of the invention relates to the use of the invention according to the different embodiments described herein in a heterogeneous communication system. The first and second network control entity may control tracking areas in which different access technologies are utilized for communicating data to or from the mobile terminals.

Furthermore in another exemplary embodiment of the invention the tracking areas to which the mobile terminal has registered respectively by means of the tracking area update message overlap at least partly.

In a further embodiment, the first and second network control entities are each part of a core network respectively, and wherein the first and second network control entity are either linked through a direct interface ore via at least one intermediate network node.

Moreover, according to another embodiment of the invention, the first and the second network control entity is capable of communicating with the mobile terminal through a first and second radio access network respectively.

In another exemplary embodiment the network control entities provide a mobility management function to mobile terminals within their respective service range.

Moreover, the marked mobile terminal may all have subscribed to a multicast or broadcast service. In one example the multicast or broadcast service is provided to the mobile terminals within the mobile communication network via different network entities providing a user plane for the service.

As previously mentioned, it is also foreseen in some embodiments of the invention that mobile terminals may provide some sort of "deregistration" from previous tracking areas. According to an exemplary embodiment of the invention, a method for updating a mobile terminal's tracking area registration in a mobile communication system is provided. A terminal is assumed to be in idle mode and to be registered to plural tracking areas simultaneously. The mobile terminal may for example transmit an attachment indication to a network control entity controlling a tracking area to which the mobile terminal is attached. This attachment indication may indicate to the network control entity controlling the tracking area that the mobile terminal is currently attached to the tracking area served by the network control entity. The mobile terminal may transmits the attachment indication in case the mobile terminal has recognized at least one cell change within said tracking area controlled by the network control entity or has not changed the tracking area for a given time period smaller than a time period for providing periodic tracking area updates.

In one exemplary embodiment, the attachment indication is sent in form of a tracking area update message. The tracking area update message may for example comprise and identifier of the tracking area controlled by the network control entity, being the current tracking area, as the old tracking area. As indicated above, the network control entity receiving such tracking area update may interpret this message as a "deregistration" of the mobile terminal from previous tracking areas.

In a further variation the mobile terminal may not send the attachment indication immediately after the first cell change. Instead, it may be also foreseen that the number of cell changes upon which the attachment indication is to be transmitted in configurable, which would for example allow the network to set a threshold after which number of cell changes within a tracking area the mobile terminals should autonomously update their tracking area registration.

In a further embodiment, the network control entity may maintain context information for the respective mobile terminals in idle mode served by the network control entity. The context information for a respective mobile terminal may for example comprise information for identifying network control entities controlling respective other tracking areas at which the respective mobile terminal is registered simultaneously. The network control entity may determine (in response to receiving the attachment indication from the mobile terminal) at least one other network control entity controlling at least one other tracking area at which the mobile terminal is registered and may deregister the mobile terminal at the at least one other network control entity controlling.

A further embodiment of the invention relates to a network control node for detecting the point of attachment of mobile terminals moving within a mobile communication network in idle mode. The network control node comprises a processing unit and memory for maintaining at a first network control entity context information for the respective mobile terminals in idle mode served by the first network control entity and a transmitter for transmitting a notification for verifying the current point of attachment of said marked mobile terminals. Further, the network control node may comprise a receiver for receiving at the first network control entity information indicative of whether at least one marked mobile terminal in idle mode is currently attached to a radio access network within the tracking area controlled by the first network control entity.

Another embodiment of the invention relates to a mobile communication terminal for updating the mobile terminal's tracking area registration in a mobile communication system being logically divided into plural tracking areas. The mobile terminal comprises a transmitter for transmitting from a mobile terminal to a network control entity controlling a tracking area attachment indication indicating to the network control entity controlling the tracking area that the mobile terminal is currently attached to the tracking area served by the network control entity. The mobile terminal may transmit the attachment indication in case the mobile terminal has recognized at least one cell change within said tracking area controlled by the network control entity or has not changed the tracking area for a given time period smaller than a time period for providing periodic tracking area updates.

Moreover, the invention according to another embodiment relates to a mobile communication system that comprises at least one network control node and a mobile terminal as described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
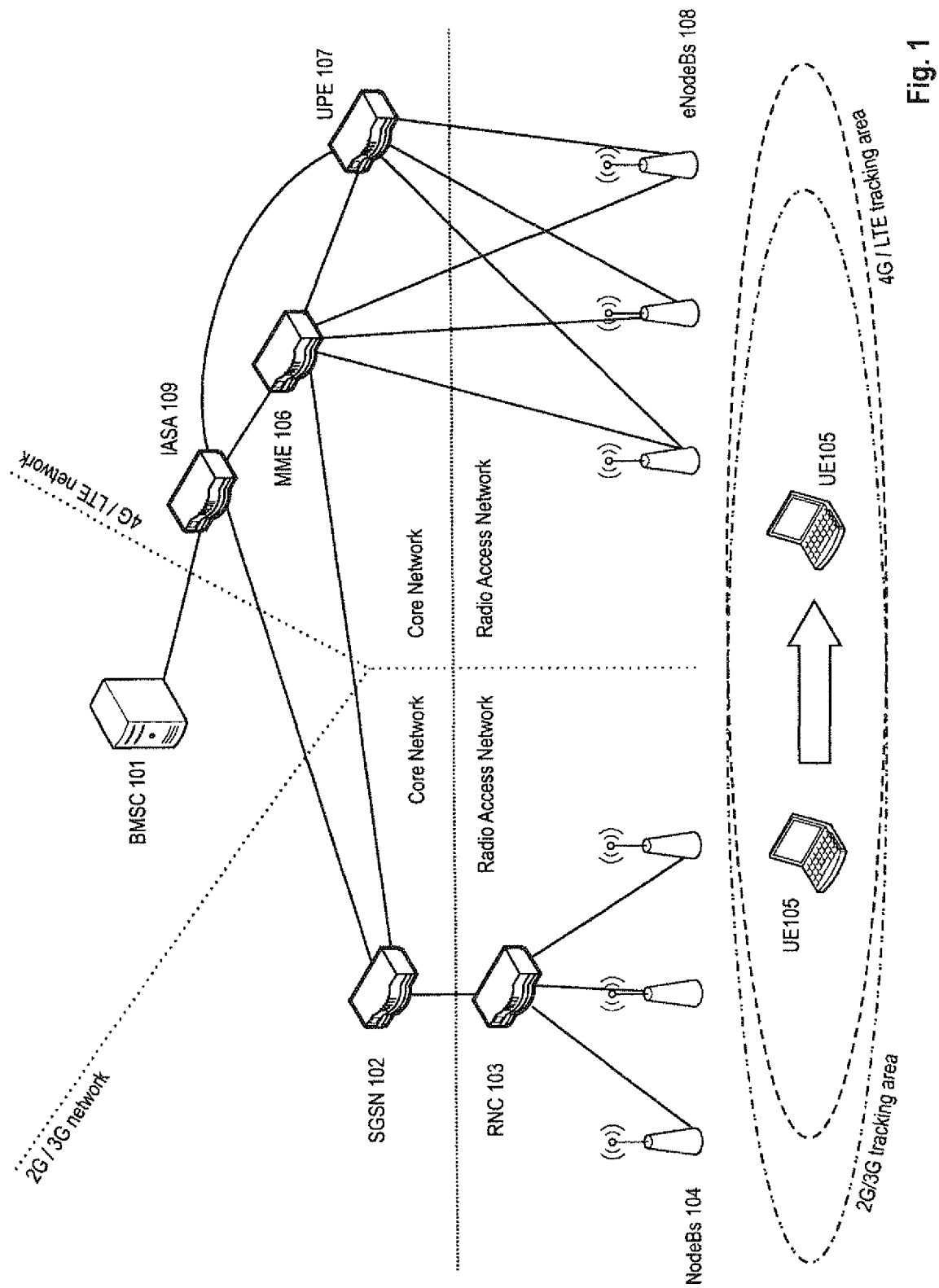
FIG. 1 shows an exemplary overview of a heterogeneous communication system, a part of which is a 2G/3G system and the other part being a 4G or SAE/LTE system.
Figure 2:
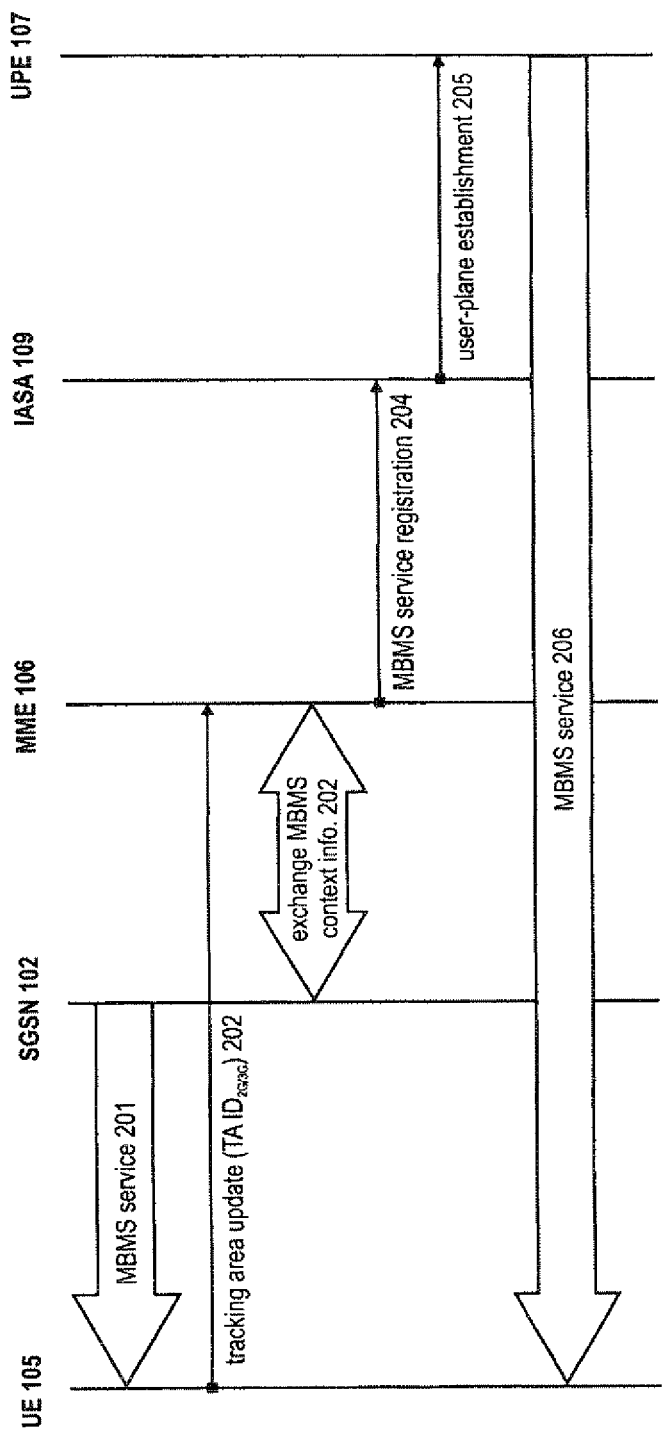
FIG. 2 shows an exemplary signaling procedure performed by a mobile terminal when moving from the 2G/3G network part of FIG. 1 to 4G/LTE network part of FIG. 1.

The following paragraphs will describe various embodiments of the invention. For exemplary purposes only, most of the embodiments are outlined in relation to an (evolved) UMTS communication system according to the 2G/3G and SAE/LTE discussed in the Background Art section above. It should be noted that the invention may be advantageously used for example in connection with a mobile communication system such as a 2G/3G or SAE/LTE communication system previously described, but the invention is not limited to its use in this particular exemplary communication network.

The explanations given in the Technical Background section above are intended to better understand the mostly 2G/3G and SAE/LTE specific exemplary embodiments described herein and should not be understood as limiting the invention to the described specific implementations of processes and functions in the mobile communication network. For example the invention may be also applied in heterogeneous networks utilizing different radio access technologies where the concept of dividing the respective access networks into tracking areas is applicable and/or provided. For example, the invention may be advantageously utilized in so-called hot spot areas where a single or multiple network providers install additional access systems at specific locations (such as airports, train stations, etc.) allowing for utilizing services with an increased quality of service in comparison to the parallel wide-area access technologies. In this respect, it may be for example feasible to install an SAE/LTE system at a hot spot in addition to a 2G/3G UMTS network. Similar, another scenario may be the use of (additional) WLAN systems at a hot spot that supplement a 2G/3G UMTS network.

Nevertheless, it should be noted the improvements proposed herein may be readily applied in the architectures/systems described in the Technological Background section and may in some embodiments of the invention also make use of standard and improved procedures of theses architectures/systems.

As already indicated previously, one aspect of the invention is the provision of a mechanism for enabling the management of mobile terminals in idle mode. This may be particularly applicable to the management of mobile terminals that continuously receive receiving a service (such as for example a multicast or broadcast service) within a mobile communication system while moving in the network in idle mode. The mobile communication system according to the respective access technology may be assumed to be logically divided into plural tracking areas.

According to this mechanism, mobile terminal are assumed to move through the network in idle mode and are simultaneously registered to more than one tracking area. One aspect of the invention is to detect that mobile terminals of other tracking areas have entered a particular tracking area controlled by a so called network control entity (that could be for example an SGSN or an MME) and are simultaneously registered to this particular tracking area and another tracking area. This detection may be for example performed for individual terminals (i.e. on a per-mobile terminal basis), for particular services (i.e. on a per-service basis) or even on a per-tracking area basis. According to the detection result, context information may indicate from which respective other tracking areas mobile terminals have attached to the tracking area controlled by the respective network control node maintaining the context information. As indicated previously, it is assumed that mobile terminals registered to plural tracking areas simultaneously do not need to update their location by means of signaling as long as they move within the tracking areas in which they are registered, e.g. as long as they receive a tracking area identifier from the radio access network they are attached to that corresponds to a tracking area for which they have previously registered.

If the detection is performed on a per-mobile terminal basis, a marker in context information related to a respective mobile terminal may be set. This marker could be for example a flag indicating that the respective mobile terminal is registered to another tracking area than that controlled by the respective network control node maintaining the context information for the mobile terminal. Alternatively (resulting in an "implicit marker") or in addition the context information may also indicate the tracking area(s) or an identification of the network control entity/ies controlling the respective tracking area(s) to which the respective mobile terminal is attached in addition to the tracking area controlled by the respective network control node maintaining the context information. The other tracking area(s) may be identified for example by the respective tracking area identifier while the network controls entity/ies may be identified by an address.

Alternatively, the detection results may be maintained on a per-service basis. This option may be suitable in cases a service is offered in plural tracking areas (for example a multicast or broadcast service that is offered at a hot-spot utilizing different access technologies for the tracking areas covering the hot-spot area). Essentially, the same information as for the per-mobile terminal case described above may be maintained. In contrast to the per-mobile terminal case the information on the tracking area(s) or an identification of the network control entity/ies controlling the respective tracking area(s) may be for example maintained in a service-related context rather than in a mobile terminal-related context. Obviously, the accuracy of the maintained information for the per-service basis case is less accurate than for the per-mobile terminal case as the network control entity maintaining the context information may not differentiate any longer which mobile terminals of all mobile terminals that receive the service in its tracking area have actually registered to another tracking area. However, the per-service basis case has the advantage of reducing the overhead in maintaining and updating the context information in comparison to the per-mobile terminal case, while still providing sufficient information for a adequate management of system resources and mobile terminals as will be outlined below in further detail.

One example for detecting mobile terminals that have registered or are registering to more than one tracking area may be the reception of a tracking area update at a network control entity. It may be assumed for exemplary purposes that tracking area updates indicate the tracking area to which the respective mobile terminals have attached prior to switching their point of attachment to the radio access network belonging to the network control entity's controlled tracking area. Accordingly, the network control entity receiving the tracking area update may evaluate the tracking area update message and may update (service related) context information accordingly as indicated above. Hence, for the per-mobile terminal case, the context information for the mobile terminal may be supplemented by an indication of the old tracking area (as indicated in the tracking area update) and/or an identifier/address of the network control entity controlling the old tracking area. For the per-service case, the old tracking area (as indicated in the tracking area update) and/or an identifier/address of the network control entity controlling the old tracking area may be added to a list of "other" tracking areas/the network control entities if not yet present therein.

Generally, the identifier or address of a network control entity to which a mobile terminal is attached may be derived from a (possibly temporary) terminal identifier that is assigned to the mobile terminal by the network control entity. This terminal identifier may also be part of the tracking area update and when received at a network control entity might be used to derive an identifier/address of the network control entity controlling the old tracking area, as described above.

Another aspect of the invention is the confirmation of the point of attachment of mobile terminals to a particular tracking area. This confirmation (or verification) may be done generally for all mobile terminals in the tracking area, for those terminals receiving a service in a tracking area or for marked mobile terminals.

In order to verify which (marked) mobile terminals in idle mode are attached to the network control entity controlling a particular service area, one exemplary implementation foresees the transmission of a notification to the mobile terminals so as to request the desired subset of terminal (e.g. the marked terminal only) in the particular tracking area to respond with sending an indication of their respective current point of attachment to the network control entity.

The attachment indication of the mobile terminals may be for example sent in form of a tracking area update indicating the current tracking area controlled by the network control entity as the "old" tracking area. This tracking area update may be considered a verification of the respective mobile terminal's point of attachment and/or deregistration from its other tracking areas to which it has registered in the past. The attachment notification may be sent by the mobile terminals autonomously or in response to a trigger (such as the notification to indicate the point of attachment). Different exemplary mechanisms according to various exemplary embodiments of the invention will be described herein.

Generally, it is to be noted that idle mode mobility in which only high-level knowledge on the mobile terminal's locations (e.g. on a tracking area level) within the communication network is assumed in most scenarios and exemplary embodiments described herein. However, it should be noted that the invention with respect to the deregistration of terminal in the previous tracking areas is also applicable to situations where a mobile terminal in idle mode attaches to a new, other radio access technology than presently connected and where the mobile terminal is no longer in idle mode, if the mobile terminal does not deregister from its previous tracking area.

Figure 3:
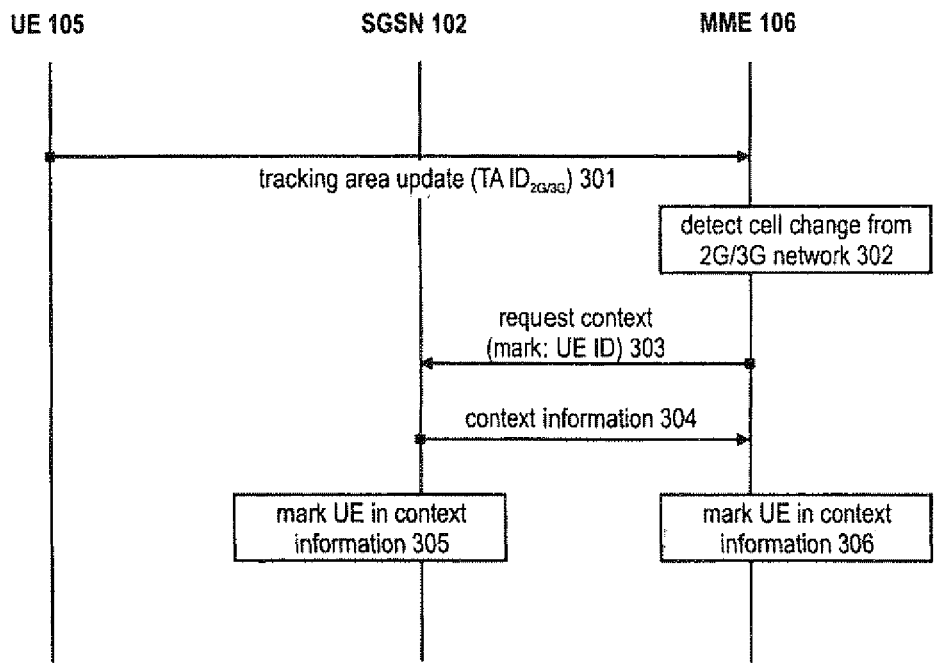
FIG. 3 shows an exemplary signaling procedure for detecting mobile terminals in idle mode that have attached to plural (e.g. two) tracking areas simultaneously according to one exemplary embodiment of the invention.

FIG. 3 shows the signaling flow for detecting mobile terminals in idle mode that have attached to plural (e.g. two) tracking areas simultaneously according to one exemplary embodiment of the invention. For exemplary purposes a network as shown in FIG. 1 is assumed, i.e. a heterogeneous network. In this exemplary embodiment it may be assumed further that the mobile terminal UE 105 has been initially attached to the tracking area provided in the 2G/3G network part of FIG. 1. Accordingly, SGSN 102 may be considered a network control entity that implements a mobility management function for UE 105 and controls a tracking area in the 2G/3G network part.

Upon UE 105 having entered into an area in which two tracking areas of the 2G/3G network part and the 4G/LTE network part overlap, UE 105 may decide to register in the 4G/LTE tracking area controlled by MME 106 (which is—in this example—a network control entity within a 4G/LTE system), e.g. due to the 4G/LTE being able to provide a higher quality of service, due to radio condition, or the like.

Accordingly, if UE 105 has previously not registered at MME 106, UE 105 sends 301 a tracking area update message to MME 106 to register in the new tracking area of the 4G/LTE system. Typically this message contains location information like assigned tracking area (e.g. valid in the old access system). In one example, the UE 105 would send the tracking area update message containing tracking area information used in the in the 2G/3G network part (UTRAN). The network control entity in the 4G/LTE system (i.e. MME 106) receiving this kind of location update message can identify that UE 105 will subsequently be able to utilize the concept of limited signaling for idle mode mobility, i.e. is a marked terminal. In one example, UE 105 may switch from idle state to active state for sending the tracking area update but may return to idle state again upon having performed the tracking area update (e.g. upon having received a confirmation to the update from the network—not shown in FIG. 3).

The tracking area update may comprise a tracking area identifier (TA ID)) of the tracking area to which the respective terminal has registered last. In this example, the tracking area update thus comprises an indication of the 2G/3G tracking area by means of the tracking area identifier TA $ID_{2G/3G}$. Based on this tracking area identifier and its knowledge on the network topology, MME 106 may resolve an address or identifier of the network control entity, i.e. SGSN 102, in the 2G/3G tracking area.

Alternatively, the tracking area update may also indicate an address or identifier of the network control entity of the old tracking area. This might be indicated either explicitly or implicitly, for example as part of the terminal identifier (such as a Temporary Mobile Subscriber Identity (TMSI) used in CS domain or a Packet-TMSI (P-TMSI) used in PS domain). Based on the tracking area update, MME 106 can detect 302 that the message from the terminal indicates a 2G/3G tracking area. As it is assumed that no deregistration from a previous tracking area will automatically occur upon UE 105 moving through the network in idle mode. Accordingly, UE 105 has potentially now registered for more than one tracking area simultaneously and has moved to the 4G/LTE tracking area without informing the network control node in the 2G/3G tracking area of its movement.

The context information in MME 106 handling the UE 105 in the new access network may not be established from scratch. Instead the network control entity may get into contact with the network control entity handling the terminal in the old access network (i.e. SGSN 102) and relevant context information will be transferred between them.

For this purpose, upon receiving the tracking area update from UE 105, MME 106 may resolve the an address or identifier of the serving SGSN 102 in the 2G/3G network part and queries 303 SGSN 102 for UE 105 related context information to establish a context for UE 105 in MME 106. In this query the MME 106 may indicate that it has received a tracking area update from UE 105 and that UE 105 potentially registered not only to the 2G/3G tracking area controlled by SGSN 102 but also to the 4G/LTE tracking area controlled by MME 106.

In context transfer procedure initiated by the query, the network control entity that received the location update (MME 106) can inform the other network control entity (SGSN 102) about the new access system information like the new assigned 4G/LTE tracking area in the new access system. For example, the new access system information (e.g. new tracking area) could be comprised in a SGSN Context Request or SGSN Context Acknowledge message.

For this purpose the request sent 303 to the SGSN 102 may for example comprise a temporary, static or semi-static identifier of UE 105 (such as a Temporary Mobile Subscriber Identity (TMSI) used in CS domain or a Packet-TMSI (P-TMSI) used in PS domain) and either an indication of this terminal being now attached to the 4G/LTE tracking area (as well). This indication could be either implicit, i.e. by means of the request itself (SGSN 102 could derive the address or identifier of MME 106 and/or its tracking area from the request) or an explicit for example by means of a flag or by including the 4G/LTE tracking area or the address or identifier of MME 106 to the tracking area update.

Upon receiving the request from MME 106, the SGSN 102 handling the terminal in the old 2G/3G access system is now aware that UE 105 will subsequently be able to utilize the concept of limited signaling for idle mode mobility, i.e. is a marked terminal. Moreover, SGSN 102 will respond 304 to the request by sending the requested context information to MME 106.

The exchange of messages in steps 303, 304 may be also considered both network control entities registering at each other, e.g. each storing the contact information of the other network control entity, to inform or to be informed when to trigger location updates from the marked terminals. MME 106 and SGSN 102 may update 306, 307 their context information. As indicated above, this could be for example realized by marking mobile terminal related context information in MME 106 and SGSN 102 on a per-mobile terminal basis. This would allow the respective network control entities to exactly determine which of the mobile terminals are "unsecure" with respect to their current point of attachment to the network.

In one further exemplary embodiment described in the following with respect to FIG. 4 it may be further assumed that a multicast or broadcast service is provided in the tracking area of both network parts, i.e. in the 2G/3G network part and the 4G/LTE network part. Accordingly, upon UE 105 having sent 301 the tracking area update and MME 106 having detected 302 that UE 105 has been attached to a tracking area of a 2G/3G network part as described above and is thus potentially "unsecure" with respect to its point of attachment, MME 106 may further determine 401 whether UE 105 has registered for an MBMS service. If so MME 106 requests the MBMS UE context of UE 105 from SGSN 102 the address or identifier of which MME 106 could be derived from the terminal identifier or the tracking area identifier included in the tracking area update message. As described for FIG. 3 above, the request for the MBMS UE context for UE 105 of MME 106 may further provide an indication to SGSN 102 that UE 105 for which the context is requested is potentially registering to more than one tracking area, so that also SGSN 102 may take appropriate steps.

SGSN 102 provides 403 MME 106 with the requested context in response to the query. Further, the respective network control entities could mark 404, 405 the respective "unsecure" mobile terminals in a terminal related and multicast/broadcast service related context information (such as for example an MBMS UE context).

Figure 4:
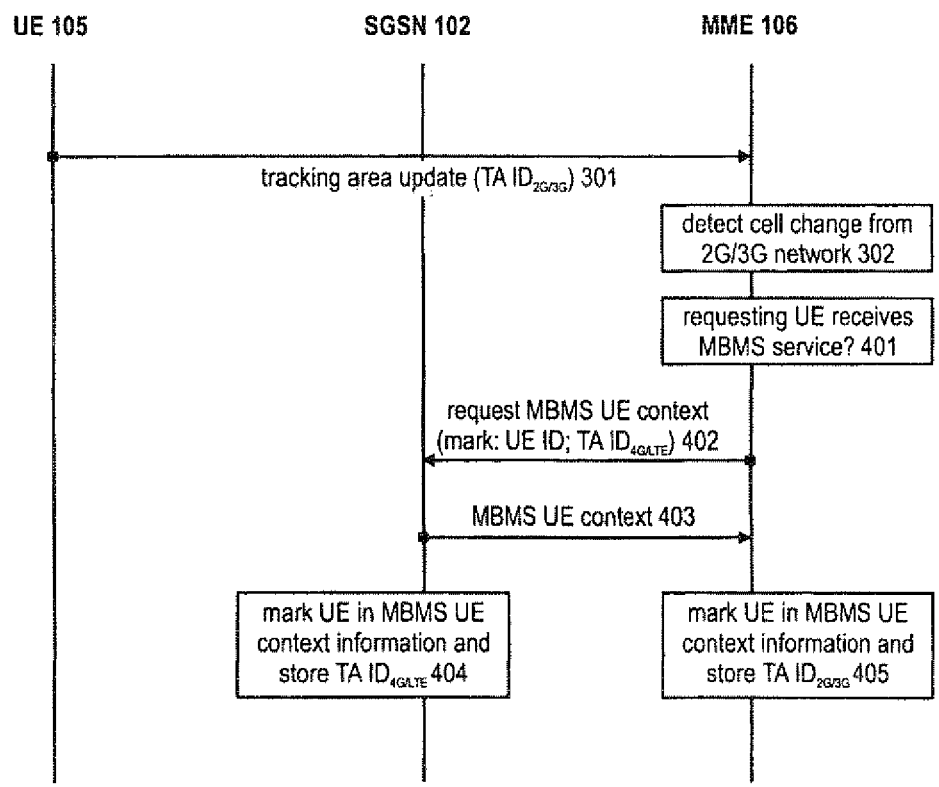
FIG. 4 shows an exemplary signaling procedure for detecting mobile terminals in idle mode that have attached to plural (e.g. two) tracking areas simultaneously according to one exemplary embodiment of the invention, in which it is assumed that a multicast or broadcast service is provided in the tracking area of both network parts.

Alternatively, a "marking" on the service level may be foreseen as well. In this case, the network control entities SGSN 102 and MME 106 could indicate the respective other's tracking area or address/identifier in a multicast or broadcast service related context (e.g. MBMS service context) so as to indicate that at leas one mobile terminal receiving the service has registered (for the service) in multiple tracking areas.

it should be noted that the update of the context information in FIG. 3 and FIG. 4 (see steps 305, 306, 404, 405) may occur at any time instance after the respective network control entity having (established the context—if not already present—and) gained knowledge of UE 105 being potentially further registered to another tracking area than that controlled by the respective network control entity.

Next, another aspect of the invention, namely the utilization of the enhanced context information on the mobile terminals in idle mode that have potentially registered to more than one tracking area is elaborated on in further detail. As has been indicated previously, for a mobile terminal using the concept of limited signaling for idle mode mobility it may be unknown in which tracking area (and in case of considering overlapping tracking areas of two different access systems, even to which access system) the mobile terminal is currently attached.

According to one further aspect of the invention the network control entities may be provided with a possibility to trigger "marked" terminals to provide their current location, i.e. to inform the network about currently selected access system (e.g. UTRAN or E-UTRAN). The network entity handling the mobile terminal in the current access system, receiving the location update, may optionally inform the control entity handling the terminal in the different access system about the updated location. This knowledge could for example allow the informed network control entity to release the corresponding context information for the mobile terminal and optionally to terminate unnecessary resources in the network, such as for example a multicast user plane (e.g. in case no terminal is longer receiving the service in the tracking area of the informed network control entity).

As will be outlined in further detail below, it may be further advantageous to limit the required signaling in idle state so that network control entities handling different access systems register at each other to be informed when to trigger location updates from marked terminals. The decision when to trigger location updates, which may also require informing registered network control entities, can be based on different criteria. For example a probability-based scheme will be outlined below, taking into account the number of marked terminals in order to assess the probability that all terminals selected the same access system. Another scheme is based on service requirements like quality of service (QoS). Further also a combination of different schemes may be implemented.

By means of triggering location updates from the marked mobile terminals and reacting on the update accordingly, unnecessary consumption of network and radio resources for multicast services may be avoided while limited signaling for idle mode mobility between different access systems can be maintained.

Utilizing the mechanism described above, the network control entities handling mobile terminals in the different access systems may possess a set of "marked" context information for all the marked terminals (or for a particular services). Further, they know which entity is responsible for handling marked terminals (or the mobile terminal receiving the service) in the other access system. As discussed before, there might exit situations where it would be beneficial for the network control entities to know the exact location of the marked terminals in order to optimize resources utilized for provision of multicast services.

For example, one exemplary situation might exist when a network control entity maintains only marked terminal contexts. If the number of such contexts is small, there might exist a high probability that all corresponding terminals are currently located in the same access system. In this scenario it would be beneficial to know the exact location of the terminals in the network, as this would allow the network control entity handling the terminals in the access system in which they are not present to release the allocated resources for providing the multicast service.

In case a network control entity detects such a condition, it might trigger location updates to be provided for the marked terminals, allowing it to take appropriate measures. To base that decision on the number of maintained marked contexts is one option.

Another situation in which knowledge on the marked terminals' actual attachment point to the network would be desirable might (also) take into account service requirements (e.g. if all terminals are receiving a common multicast or broadcast service). These service requirements or constraints (such as QoS) might be known at the network control entity from a maintained service-related context. Location updates may be for example be triggered when the service requirements would allow a possible termination of the service's user plane (e.g. the multicast user plane).

Considering real-time (RT) services as an exemplary multicast or broadcast service, a service interruption needs to be avoided as much as possible. In such a case it might be more beneficial to leave the multicast user plane established, e.g.

limiting losses when terminals move between access systems, compared to the gains of resource savings.

Further, in order to determine whether to have the (marked) terminal or the terminals receiving a particular service to update their location may also be based on combinations of above outlined criteria.

Figure 5:
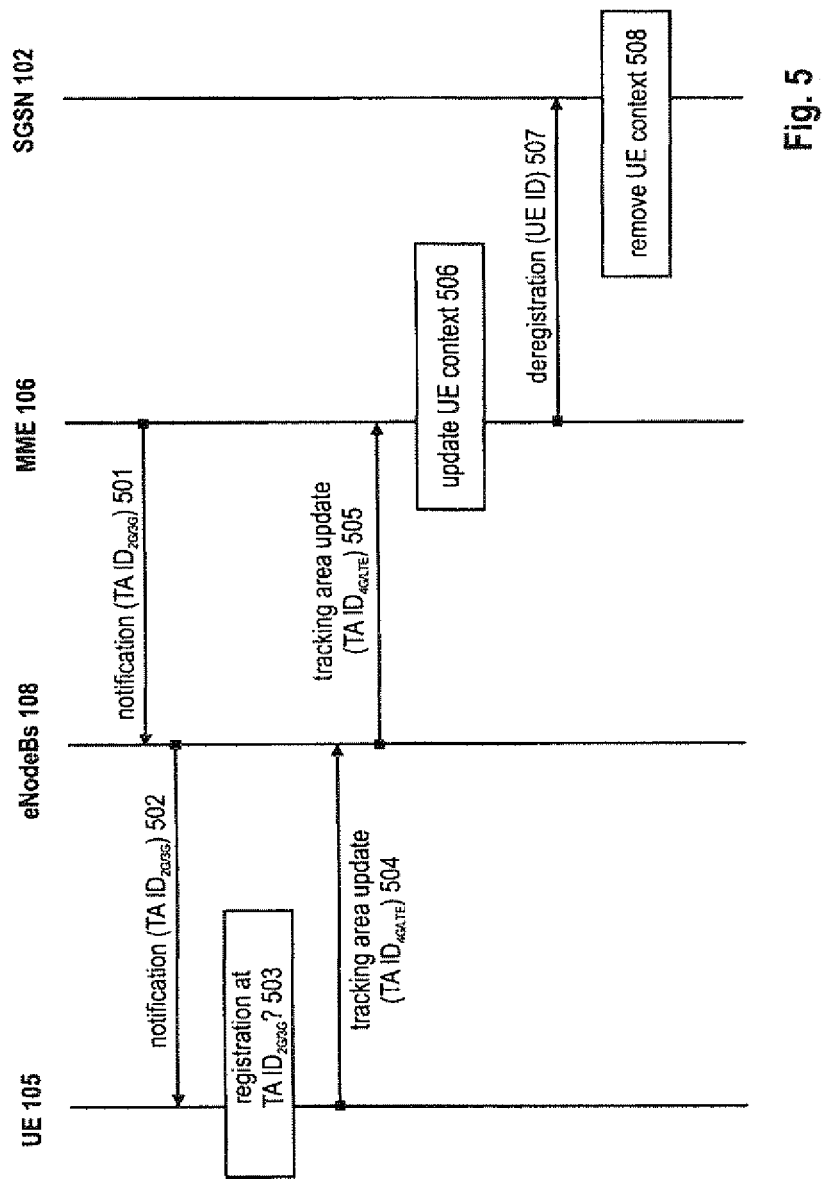
FIG. 5 shows an exemplary signaling procedure in a mobile communication system according to an embodiment of the invention, in which mobile terminals are triggered to update their location.

FIG. 5 shows an exemplary signaling flow in a mobile communication system according to an embodiment of the invention in which mobile terminals are triggered to update their location. After having decided by a network control entity such as MME 106 that the actual point of attachment of mobile terminal that have been marked or that are receiving a particular service should be verified, MME 106 may trigger the location update by a notification that is sent 501, 502 by MME 106 via the base stations (eNodeBs 108) of its tracking area.

Mobile terminals in an idle state do not maintain any active connection, also no signaling connection (RRC connection), with the network. As discussed before, if they do not move into an unregistered mobility area or a periodic update time does not expire, they won't setup a signaling connection and update their respective location in the network. However, even in idle state the terminals typically monitor some broadcasted system information, e.g. to listen for paging messages. For example, for an MBMS service mobile terminals receiving multicast service also listen to specific multicast notification channels, besides the channel transmitting the actual multicast data. For cellular communication systems as specified by 3GPP, the Broadcast Control Channel (BCCH) and Multicast Control Channel (MCCH) represent such channels.

Accordingly it may be advantageous to utilize these channels for carrying 501, 502 the notification to the mobile terminals in the tracking area controlled by the triggering MME 106. The notification including information triggering the marked terminals to provide their current location to the network may for example use the MME's 106 knowledge on the "other" tracking areas in which mobile terminals have registered. As discussed above, the network control entities handling the terminals having (potentially) registered to other tracking areas might possess the information about the registered mobility area of the terminal in the other access system. Hence, MME 106 could include information on the other mobility areas (e.g. in the different access system) to the notification message. In FIG. 5 this is indicated by the notification message including the tracking area identification TA ID$_{2G/3G}$ of the 2G/3G tracking area controlled by SGSN 102 (see FIG. 1) assuming that MME 106 has found (upon checking the relevant UE related contexts or the service context) that mobile terminals are potentially registered to this tracking area as well.

The notification message may be for example broadcast in the radio cells of the tracking area controlled by MME 106. For example, the notification may be broadcast by the respective eNodeBs 108 in addition to the system information broadcast in the respective radio cells. Considering a cellular communication network as specified in 3GPP an eNodeB typically broadcasts tracking area information of the E-UTRAN cell which might in addition include also information about the "other" tracking area(s) to which the mobile terminals are potentially further registered (in the example shown in FIG. 5 the 2G/3G tracking area controlled by SGSN 102 in UTRAN part of FIG. 1).

Similarly in a 2G/3G system an RNC (radio network controller) might include tracking area information on the "other" tracking area(s) to which the mobile terminals may potentially be registered in its broadcasted system information in its UTRAN cells.

As stated above a mobile terminal in idle state (including UE 105 in FIG. 5) might constantly monitor broadcasted system information. UE 105 may compare the tracking area information in the broadcasted system information with the one stored in context information maintained at the terminal. Regarding mobility, it would trigger a location update when detecting a different mobility area.

Of course the mobile terminal is aware that it is registered to another tracking area than that it is currently receiving the system broadcast information from in idle state. Further, from its stored context information it may also be aware that it is participating in a multicast service. Therefore, in addition to the normal reception of broadcasted system information the mobile terminal can listen whether a notification relevant for the terminal is broadcasted in the current cell.

For above-mentioned notification option, the marked terminal can check 503 whether it is registered to one of the (or optionally all) mobility area(s) indicated in the notification. If this is the case, the terminal may provide a location update, even if it neither changed to a different tracking area nor its periodic update timer expired. For example in the exemplary embodiment depicted in FIG. 5 UE 105 may provide 504,505 a tracking area update to MME 106 via the 4G/LTE access network (eNode Bs 108).

The tracking area update sent by the mobile terminal may comprise information about the mobility area in its currently selected access system. As it is assumed in FIG. 5 that UE 105 has attached to a radio access network part of within the 4G/LTE tracking area of MME 106 the tracking area update may for example comprise the tracking area identifier TA ID$_{4G/LTE}$ of the 4G/LTE tracking area as the "old" tracking area. The network control entity receiving the triggered location update from the mobile terminal, i.e. MME 106, is thus informed on the actual location of UE 105 in the network. As the notification may potentially trigger more than the terminal UE 105 to respond with sending a tracking area update (i.e. given that the terminals are actually attached to the radio access network part of within the 4G/LTE tracking area of MME 106) MME 106 may receive location update from all plural terminals. Based on the location updates from the terminals within the 4G/LTE tracking area of MME 106, MME 106 may update 506 the corresponding context(s) accordingly, e.g. removing the context marking for marked terminal terminals. In case MME 106 maintains only information on potential other tracking areas providing a multicast or broadcast service where mobile terminals may potentially have registered per-service, MME 106 could delete the list of "other" tracking areas in the corresponding service context after having transmitted the notification and having received the location updates from the terminals.

Further, in a variation of the embodiment, MME 106 may inform 507 all other registered network control entities (e.g. SGSN 102) where mobile terminals may have potentially also registered. For example, in case the marking of the context information is realized on a per-terminal basis, MME 106 may exactly know which terminal having sent a location update in response to the trigger by MME 106 has registered in which other tracking area and may thus e.g. explicitly inform SGSN 102 that UE 105 is now attached to the 4G/LTE tracking area controlled by MME 106.

Thereby, the other network control entities may be made aware of the mobile terminals' location and might decide to also update 508 the context information (which could for example mean the deletion of the corresponding terminal context). Regarding the provision of the multicast service this might allow the network control entities to terminate resources allocated unnecessarily. Thus waste of these scarce resources can be avoided. For example in FIG. 5, the SGSN 102 may detect that no further terminals require the multicast service and so releases the allocated resources for the multicast U-plane After having sent the notification and having clarified which mobile terminals (e.g. receiving a particular service) are currently attached to the tracking area of MME 106 the further notification of terminals may be stopped again (e.g. it is no longer necessary to additionally broadcast information on the potential other tracking areas to which mobile terminals may have additionally registered within the system broadcast information). Therefore, no further unnecessary location update messages would be triggered.

Figure 6:
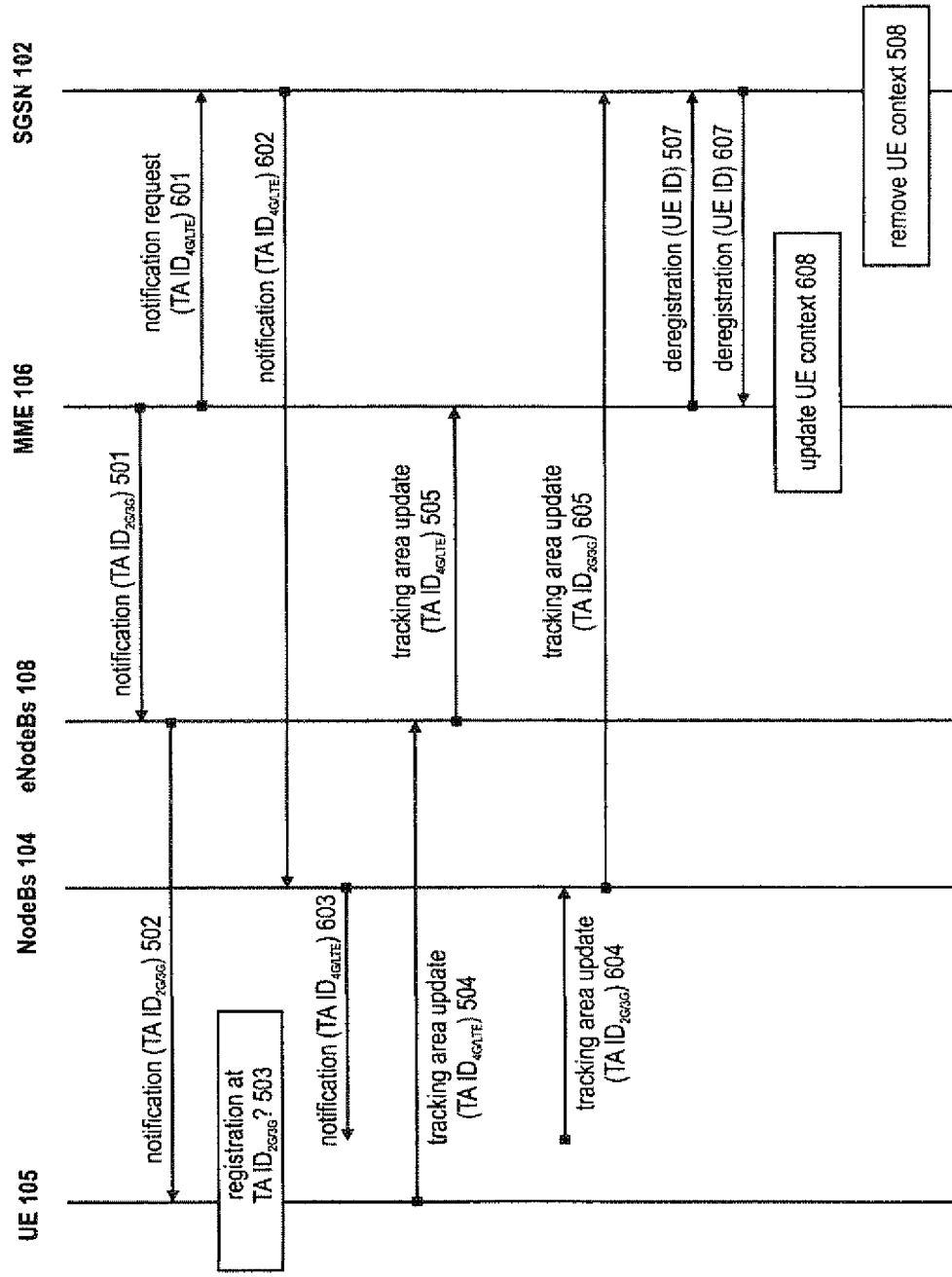
FIG. 6 shows another exemplary signaling flow in a mobile communication system according to an embodiment of the invention in which mobile terminals are triggered to update their location in multiple tracking areas.

While the exemplary embodiment of FIG. 5 assumes that a notification for triggering mobile terminals to report their current point of attachment is only provided in the 4G/LTE tracking area, also a coordinated notification scheme may be used. Accordingly, a network control entity may ask other network control entities controlling tracking areas indicated as potential further registration areas to also notify and trigger mobile terminals to indicate their current location. Accordingly, FIG. 6 shows another exemplary signaling flow in a mobile communication system according to an embodiment of the invention in which mobile terminals are triggered to update their location in multiple tracking areas. Essentially, the steps shown in FIG. 6 are essentially similar to those in FIG. 5 concerning the notification and location updates in the 4G/LTE tracking area controlled by MME 106. In addition to the "local" notifications in the 4G/LTE tracking area (see 501, 502) MME 106 may send 601 a notification request to SGSN 102 to request same to also trigger location updates in its 2G/3G tracking area by sending 602, 603 a notification via the Node Bs 104 in its tracking area. The notification mechanism may thereby be identical to that in steps 501, 502. MME 106 may thereby utilize the stored information to detect which other network control entities to request starting a notification procedure in their tracking area.

Similar to the location updates (see 504, 505) some terminals having attached to the 2G/3G tracking area may respond to the notification by SGSN 102 by sending 604, 605 location updates (tracking area updates) indicating the 2G/3G tracking area as the "old" tracking area to SGSN 102. After having waited for example a predetermined amount of time for receiving the response to their respective notification messages, MME 106 and SGSN 102 may inform each other on the responses. For example, if the marking of terminals on a per-mobile terminal level is performed, MME 106 and SGSN 102 may deregister 507, 607 the terminals from which they have received a location update at the respective other network control entity. According to the responses from the mobile terminals and the potential deregistration from the respective other network control entity, SGSN 102 and MME 106 may subsequently update 508, 608 their context information.

As already mentioned above, the detection of mobile terminals in idle mode being potentially registered in plural tracking areas simultaneously and the decision whether to trigger location updates from the marked terminals might be based on service requirements/constraints. For example, network control entities handling mobile terminals that take part in a multicast service that is provided in different tracking areas typically possess some information about the service requirements. For this purpose they might maintain a service context. For an MBMS service the service requirements are typically stored in the MBMS service context information. The context information is typically used for resource reservation and resource allocation related to the multicast service within the core network and for the air interface resources. A MBMS Bearer context as specified for multicast service in 3GPP is an example of a service-related context maintained by a network control entity.

Information about QoS will typically be contained in a service context. However, also information on operator preferences might be part of the context information. This information may be used by a network control entity to derive service distribution policies from the service context. Optionally some operator preferences might be stored separately in the network control entity or might be derived from a policy service in the network. For example, a network control entity might derive from the information on QoS and operator preferences that a multicast service is provided in a specific access system, e.g. E-UTRAN, with a high QoS and mobile terminals should preferably receive the service there.

This means that network control entities might be able to utilize this kind of information in order to conclude on the location of (marked) terminals or as a trigger to verify the location of terminals. For example considering a terminal that might move between UTRAN and E-UTRAN in idle state, the terminal might prefer to select an E-UTRAN cell (e.g. in the 4G/LTE network part in FIG. 1) in order to receive the higher QoS or fulfill operator preferences. In case a network control entity possess this information while maintaining only marked terminals, it might consider that likely all marked mobile terminal that are located in an area where the tracking areas of UTRAN and E-UTRAN overlap have chosen to attach to the E-UTRAN. To verify this assumption the network control entity could trigger location updates from these terminals. In case the expected situation matches the reality, some possibly unnecessary resources could be released, e.g. no user plane for the multicast service might be longer needed in the UTRAN tracking area.

Figure 7:
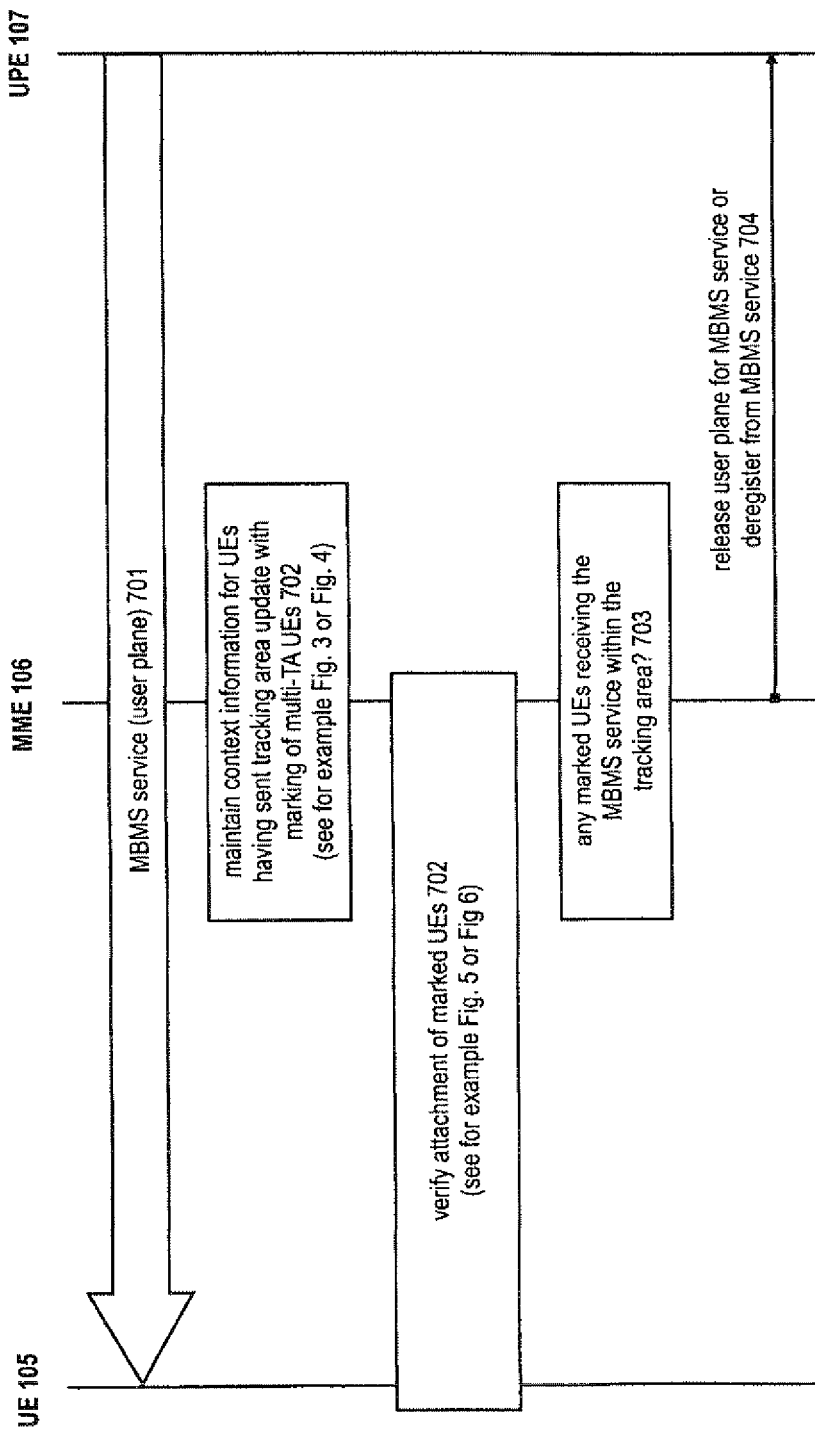
FIG. 7 shows an exemplary signaling procedure in a mobile communication system according to an embodiment of the invention in which the results of a notification procedure (i.e. the location updates) are utilized to decide on the further utilization of uplink resources for a multicast or broadcast service and FIG. 8 exemplarily illustrated a signaling scheme according to another embodiment of the invention where mobile terminals having simultaneously registered to plural tracking areas autonomously update their location.

FIG. 7 shows an exemplary signaling flow in a mobile communication system according to an embodiment of the invention in which the results of a notification procedure (i.e. the location updates) are utilized to decide on the further utilization of uplink resources for a multicast or broadcast service. In this example, it is assumed that a MBMS service is provided 701 in a communication system in several tracking areas, including a tracking area controlled by MME 106. Accordingly, a user plane for the MBMS service has been established by a UPE 107 in the 4G/LTE tracking area controlled by MME 106. As has been described with respect to FIG. 3 or FIG. 4, MME 106 may have collected information on mobile terminals in idle mode (including UE 105) that may have registered not only to the 4G/LTE tracking area of MME 106 but also other tracking area controlled by other network control entities (and optionally also using other access technologies). This information is stored in a mobile terminal related MBMS context (such as the MBMS UE Context) at MME 106. MME 106 may further decide 702 to verify the current point of attachment of the marked mobile terminals and may thus trigger location updates from the marked mobile terminals by means of a notification as described in further detail with respect to FIGS. 5 and 6 above.

Having awaited possible responses to the notification (location updates) MME 106 may determine 703 whether there are any mobile terminals left in its tracking area that are to receive the MBMS service. If not, MME 106 could release the user plane resources by sending 704 a user plane release command to UPE 107. Accordingly, UPE 107 will terminate the user plane connection in the 4G/LTE tracking area.

As discussed with respect to FIGS. 5 and 6 above, a notification scheme communicating information about tracking area(s) where mobile terminals may have additionally registered may be provided within one or more tracking areas in broadcasted system information. However, this notification scheme might result in a high signaling load. Probably many location update messages would be sent to the network, while it might be sufficient to know at least one terminal per access system at the network control entities.

For multicast services as specified in 3GPP a dedicated procedure called MBMS counting (see 3GPP 25.346 "Introduction of the Multimedia Broadcast Multicast Service (MBMS) in the Radio Access Network (RAN); Stage 2", version 7.2.0, September 2006 (available at http://www.3gpp.org/ftp/Specs/html-info/25346.htm and incorporated herein by reference) exists, which is utilized to count the number of terminals in idle state on a cell level granularity. In one exemplary embodiment, this MBMS counting procedure could be alternatively used in order to trigger terminals to indicate their current point of attachment to the querying network control entity. For example when a network control entity detects that it is only maintaining contexts of marked terminals, it might request the access system to perform a MBMS counting for the respective multicast service.

Generally all mobile terminals in idle state might respond to standard counting, i.e. also terminals in idle state whose location (access system) is know to their network control entity. With respect to this invention only responses from marked terminals are desired. In order to achieve the counting mechanism could be enhanced by including additional information in broadcasted counting parameters indicating that counting should only be performed for marked terminals. This additional information could for example be represented in the counting parameters by a flag (which would be sufficient, due to the mobile terminals being aware whether they have registered to several tracking areas in which the respective service is provided). Another option could be to include information about the mobility area to which the marked mobile terminals have potentially registered (similar to the notification in FIG. 5 or FIG. 6). Accordingly, utilizing one of the above mentioned measures mobile terminals registered to plural mobility areas simultaneously can be triggered to respond to the counting.

Utilizing the above discussed possibilities of a notification for triggering mobile terminals to indicate their location to the network, all marked terminals might be triggered to provide a location update to the network control entities at the same time. To avoid a high signaling load due to the triggered location updates, it is suggested in one further embodiment to include a probability value in the notification (or the corresponding message of the counting procedure) in addition to the indicated tracking area(s). The terminals might use this back-off factor (which may be a probability value) to calculate a random back-off time to wait before sending the requested location update to their network control entity. This might effectively distribute the triggered signaling over time. Further, also a probability factor could be included in order to trigger location updates only from a subset of all marked terminals (e.g. in case of large number of terminals). Another option would be to use the probability value as a parameter that is used to limit the number of responding terminals. For example, mobile terminals receiving the notification (or counting request) could perform a probabilistic experiment utilizing this probability value (e.g. a Bernoulli experiment) and only if this experiment is successful the respective mobile terminal provides a location update. Of course, the probability value may be used to perform both measures to limit the signaling load simultaneously (optionally different values for calculating the back-off time and for use in the probabilistic experiment could be signaled).

Next some aspects of potential interest for heterogeneous networks as shown in FIG. 1 (i.e. where a 4G/LTE subsystem and a 2G/3G subsystem is used) will be discussed in further detail. In order to support registration of network control entities, notifications and handling of location update messages some changes to the respective network control entities and the entities of the access system might be required. Considering a cellular communication system like it is specified in 3GPP which comprises different subsystems according to different development standards, like 2G/3G versus 4G/LTE, this might not be possible for all subsystems. In particular the network entities of the access systems might be most sensitive. For example, changes to UTRAN might be undesirable. However, in order to support the above outlined concepts for idle mode mobility, some changes to the network control entities might be required. Regarding network control entities of legacy access systems like UTRAN, changes should be minimized. Therefore, the notification procedures and handling of location update messages (see e.g. FIG. 5 and FIG. 6) might be performed only for access systems, e.g. E-UTRAN, where changes might be adopted more easily.

In this case network control entities handling the marked terminals in the different access systems mark the corresponding contexts accordingly and register at each other. When a network control entity decides to verify the point of attachment of the mobile terminals that have potentially registered in plural tracking areas the network control entity may inform the other network control entities yielded in the maintained context information on its decision. However (unlike FIG. 6), the notification is only performed in the access system supporting the required changes, e.g. E-UTRAN. In this case the respective network control entity might additionally start a feedback timer. When the timer expires before receiving location update from a particular terminal, it is assumed that the respective terminal is located in the other access system, e.g. UTRAN. The network control entity receiving the location updates from the terminals in the access system running the notification, e.g. E-UTRAN, informs the other network control entities about the results. Therefore, also these network control entities know about the location of the former marked terminals and eventually might release resources allocated for multicast services.

This way only parts of a cellular communication network might have to support required functionality. So changes to other parts for example entities of UTRAN access systems can be avoided.

The solutions discussed above are based on the network control entities, deciding whether to trigger location updates from the terminals. Another option might be to use a terminal-centric approach where the decision to trigger location updates is based on the mobile terminals themselves.

The mobile terminals know whether they are registered to two or more tracking areas simultaneously, i.e. might move between tracking areas (and thereby potentially between different access systems) in idle state without any signaling to the network. Such a terminal might be able to determine autonomously when to inform the network control entities about its current location.

Figure 8:
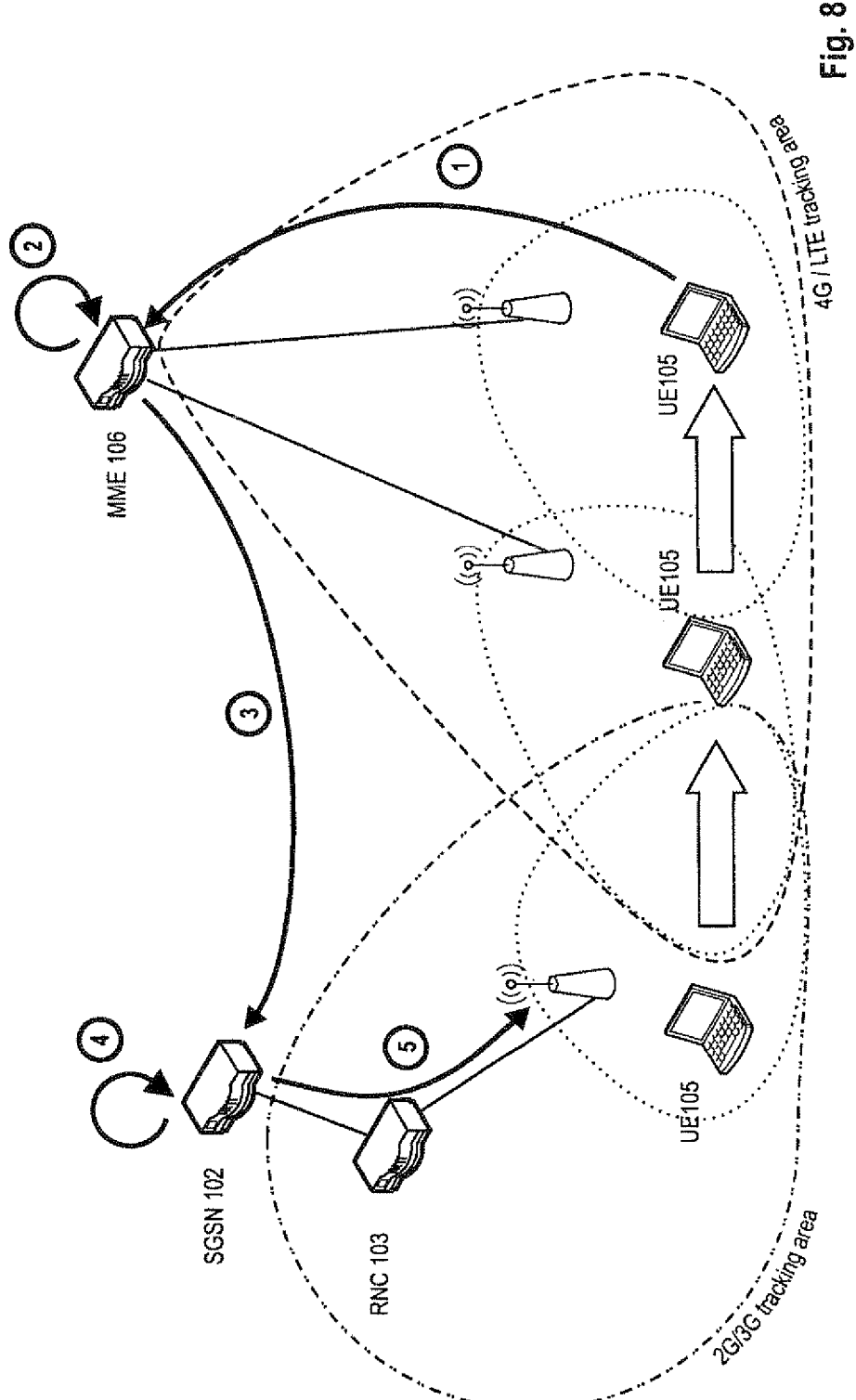

FIG. 8 exemplarily illustrates a signaling scheme according to another embodiment of the invention where mobile terminals having simultaneously registered to plural tracking areas autonomously update their location. The individual mobile terminal might for example base its decision whether to update its location on topological information. From stored context information the terminal (e.g. UE 105) can derive its currently selected access system and also its currently selected cell when moving in the network (as indicated in FIG. 8). Further, the terminal might maintain a history of previously selected radio cells (and optionally of previously selected access systems). This information might be used in the terminal (UE 105) to decide whether to provide ① a location update to the network control entity (e.g. MME 106) of the tracking area it is currently attached.

For example a terminal registered to plural tracking areas may keep on moving in the currently selected access system (e.g. the 4G/LTE system part in FIG. 8 indicated by the 4G/LTE tracking area) without leaving the 4G/LTE tracking area to which it has registered previously and while receiving a multicast service (of course latter condition is also know to the terminal.) In this case the terminal might decide to provide a location update to its responsible network control entity. For example when selecting the next cell or next several cells within the current tracking area (i.e. the 4G/LTE tracking area in FIG. 8) the terminal (e.g. UE 105) may check whether these belong to the same access system. If this is the case it might derive that it possibly won't transit back to the other access system and therefore provides a location update.

Upon receiving the location update at the network control entity (e.g. MME 106) same may determine ② from its context information that the mobile terminal may have registered to another tracking area (or access system) as well and may inform ③ the responsible network control entity (e.g. SGSN 102) in this tracking area (or access system) on the mobile terminal's indication that it is attached (and potentially also stays attached) to the access network in the tracking area controlled by the network control entity receiving the location update (which may be considered a deregistration of the mobile terminal from the other tracking areas). The network control entity (e.g. SGSN 102) receiving this information may delete ④ the respective mobile terminal's context information and may optionally further determine whether resources in its tracking area may be saved due to the mobile terminals deregistration. If for example the user plane for a service may be terminated appropriate procedures may be undertaken to free ⑤ the utilized resources.

The mechanism described with respect to FIG. 8 assumes that the mobile terminal is moving within the network and thereby passes radio cell boundaries—so that e.g. in 3GPP systems a cell (re)selection is performed by the mobile terminal. However, it could also be the case that a terminal registered to plural tracking areas remains camped on the same radio cell of a tracking area it is registered to. If the mobile terminal remains camped for a longer time, the terminal should provide a location update. In order to allow this, it might incorporate a timer, which is set to a smaller value compared to the periodic update timer. When this timer expires before selecting cell of the previous access system, the terminal sends a location update to the responsible network control entity.

With respect to cellular communication systems it is typically the case that the network maintains a high degree of control on any procedures performed in the network, which also comprises the mobile terminals. Also in the procedures where the mobile terminal may autonomously decide on the transmission of a location update, some network control may be introduced. In a further embodiment of the invention, the network may provide and control the configuration parameters that trigger autonomous location updates from the terminals. For example the network might configure the number of radio cells a terminal must transit before sending a location update. Another example might be that the network configures the timer value to be used by the stationary (camped) terminals as described above. This kind of configuration parameters might be comprised in a service announcement that is provided to the mobile terminals prior to receiving the service. Another option is to include this information in signaling messages used for terminal mobility.

Another embodiment is again related to the limitation of the signaling load for the location updates. As indicated before the signaling load may be high, if some kind of synchronized event takes place that results in many terminals deciding to provide location updates at the same time. For example such situation could occur when large groups of mobile terminals move together, e.g. users are traveling in a train. In these situations many terminals perform a cell change at the same time possibly leading to same decisions in the terminals. Similar to the embodiments described previously herein, also in cases of the mobile terminals sending location updates autonomously the signaling load might be controlled using a randomized back-off time the terminals have to wait before sending their location update or by selecting only a subset of terminal by means of a probability factor. Also these parameters might be configured and controlled by the network.

The autonomous transmissions of location updates by the terminals might be based on network-controlled parameters, but the mobile terminals will perform an autonomous update the condition defined by the parameters is fulfilled. However, the location updates from the terminals might only be required at specific times by the network. So another aspect of network control of the autonomous terminal procedures might be that the network informs the terminals when to activate it. For example the network control entities might inform the entities of the access systems to indicate the need for location updates of marked terminals in broadcasted system information. For example considering a system a specified in 3GPP, there might be a dedicated flag on MCCH. Only when the terminals receive this indication, they will determine whether to provide a location update or not.

In most examples above it has been assumed that the mobile terminal move in idle mode, which could mean that they do not maintain any signaling connection to the access network and/or do not maintain any dedicated connections to the radio access network. Another possible definition of idle mode is that the mobile terminals' location is only known on a higher level, e.g. the tracking area level (while in active mode their location may be accurately determined, e.g. on the radio cell level) and the mobile terminals may move within an instance of this higher layer (tracking area) without notifying the network thereon. Accordingly, if a mobile terminal is registered to plural tracking areas simultaneously the mobile terminal may not update its location as long as it moves in within the tracking areas to which it registered. Hence, most of the examples assumed that the mobile terminal registered to different tracking areas simultaneously and performs idle mode mobility procedures in the tracking areas.

However, the principles of the invention may also apply to situation where a mobile terminal performs registers first to one tracking area while in idle mode and registers to another tracking area (for example utilizing another access technology) where no idle mode is defined. One example would be the mobile terminal attaching to a 3GPP based system (such as E-UTRAN or UTRAN) and simultaneously to a WLAN system, where all mobile terminals are in a state comparable to the "active mode". Similar, a mobile node may be in idle mode for a first tracking area, may register further to another tracking area in idle mode and where it subsequently enters active. In both exemplary scenarios the mobile terminal may not deregister from its previous tracking area. In these examples, the actual point of attachment of the mobile terminal in the tracking area where it is in active mode may be known on a very detailed level (e.g. on a radio cell level) so that no notification or counting procedure needs to be triggered in the respective tracking area. Nevertheless, if it is determined that the mobile terminal is likely to stay in the tracking area where it is in active mode, the network control entity of this area may deregister the mobile terminal from those tracking areas the mobile terminal left using idle mode mobility.

Moreover, in most embodiments described above, the notification transmitted by the network control entities have been comprised in system broadcast information related to a multicast or broadcast service (that might for example provided on a special multicast or broadcast related control channels— e.g. Multicast Control Channel (MCCH)). In another embodiment, the notification may also be included in the system information of a general broadcast channel in the system (such as for example the Broadcast Control Channel (BCCH)). Another alternative would be to utilize paging messages to convey the notifications to the mobile terminals in a tracking area. If the mobile terminals that are potentially registered to plural tracking areas are known, the notification may be directly addressed to the individual mobile terminals. Another option is to allocate a static, semi-static or dynamic special group identifier for mobile terminals that are potentially registered to plural tracking areas within the system to which the notifications may be addressed.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for detecting the point of attachment of mobile terminals moving within a mobile communication network in idle mode, wherein the mobile communication system can be logically divided into plural tracking areas to which the mobile terminals register, the method comprising:

maintaining at a first network control entity context information for the respective mobile terminals in idle mode served by the first network control entity, wherein the context information for a respective mobile terminal comprises a marker that, when set, indicates that the respective mobile terminal has simultaneously registered to another tracking area than that controlled by the first network control entity, transmitting a notification for verifying the current point of attachment of said marked mobile terminals, and receiving at the first network control entity information indicative of whether at least one marked mobile terminal in idle mode is currently attached to a radio access network within the tracking area controlled by the first network control entity, wherein the marker, when set, further indicates that the respective mobile terminal has registered to a Multimedia Broadcast Multicast Service (MBMS) service and wherein the notification is transmitted to the marked mobile terminal as part of a counting procedure for counting the mobile terminals in the cell that receive said service.

2. The method according to claim 1, wherein the notification is transmitted by the first network control entity through a radio access network of the tracking area controlled by the first network control entity.

3. The method according to claim 1, further comprising requesting a second network control entity to transmit the notification through its attached radio access network in the tracking area controlled by the second network control entity.

4. The method according to claim 3, wherein the second network control is controlling another tracking area to which at least one marked mobile terminal has registered in addition to the tracking area controlled by the first network control entity.

5. The method according to claim 1, wherein the notification is broadcast in the tracking area controlled by the first network control entity and/or in at least one other tracking area each controlled by respective other network control entity, wherein the notification is broadcast as part of system information broadcast in the individual radio cells of the radio access network supervised by the first network control entity and/or said at least one other network control entity.

6. The method according to claim 1, wherein the marked mobile terminals respond to a common temporary, semi-static or static identifier and the notification is sent to the common identifier.

7. The method according to claim 1, wherein the notification is sent in form of one or plural paging messages individually addressed to a respective one of the marked mobile terminals.

8. The method according to claim 1, further comprising receiving by the mobile terminals the notification evaluating based on the content of the notification whether to respond to the notification or not and transmitting by at least one marked mobile terminal having received the notification an attachment indication to the network control entity controlling the tracking area to which the respective marked mobile terminal is currently attached, wherein the attachment indication indicates the tracking area to which the respective marked mobile terminal is currently attached.

9. The method according to claim 1, wherein the information indicative of whether at least one marked mobile terminal in idle mode is currently attached to a radio access network within the tracking area controlled by the first network control entity comprises the information of the attachment notifications sent by the marked mobile terminals.

10. The method according claim 1, wherein the information indicative of whether at least one marked mobile terminal in idle mode is currently attached to a radio access network within the tracking area controlled by the first network control entity is partly or entirely received from at least one other network control entity controlling another tracking area to which at least one of the marked mobile terminals is further registered.

11. The method according to claim 1, wherein the notification indicates a probability value for determining a back-off time for delaying the response of mobile terminals to the notification or a probability value for selecting only a subset of the terminal to respond to the notification.

12. The method according to claim 1, further comprising freeing network resources reserved for a multicast or broadcast service provided to the marked mobile terminals in response to the information indicative of whether at least one marked mobile terminal in idle mode is currently attached to a radio access network within the tracking area controlled by the first network control entity.

13. The method according to claim 12, wherein the network resources are freed in response to taking further into account service constraints of the multicast or broadcast service.

14. A method for enabling management of mobile terminals in idle mode receiving a service within a mobile communication system being logically divided into plural tracking areas, wherein mobile terminal may register to plural tracking areas simultaneously, the method comprising:
   receiving from a mobile terminal a tracking area update message at a first network control entity to register the mobile terminal in a tracking area controlled by said first network control entity,
   identifying by the first network control entity based on the tracking area update message a second network control entity controlling a tracking area to which the mobile terminal has previously registered,
   informing by said first network control entity the a second network control entity on the reception of the tracking area update message from the mobile terminal, and
   marking the mobile terminal in mobile terminal related context information maintained by said first network control entity and the second network control entity,
   wherein the marker, when set, further indicates that the respective mobile terminal has registered to a Multimedia Broadcast Multicast Service (MBMS) service and wherein the notification is transmitted to the marked mobile terminal as part of a counting procedure for counting the mobile terminals in the cell that receive said service.

15. The method according to claim 14, further comprising maintaining at the first network control entity context information for the respective mobile terminals in idle mode served by the first network control entity, wherein the context information for a respective mobile terminal comprises a marker that, when set, indicates that the respective mobile terminal has simultaneously registered to another tracking area than that controlled by the first network control entity, wherein the context information of a marked mobile terminal further indicate the at least one tracking area to which the respective marked mobile terminal is further registered or an identifier of the network control entity controlling the at least one tracking area to which the respective marked mobile terminal is further registered.

16. The method according to claim 14, further comprising maintaining at the second network control entity context information for the respective mobile terminals in idle mode served by the second network control entity, wherein the context information for a respective mobile terminal comprises a marker that, when set, indicates that the respective mobile terminal has simultaneously registered to another tracking area than that controlled by the second network control entity, wherein the context information of a marked mobile terminal further indicate the at least one tracking area to which the respective marked mobile terminal is further registered or an identifier of the network control entity controlling the at least one tracking area to which the respective marked mobile terminal is further registered.

17. The method according to claim 1, wherein the tracking areas to which the mobile terminal has registered respectively by means of the tracking area update message overlap at least partly.

18. The method according to claim 14, wherein the tracking areas to which the mobile terminal has registered respectively by means of the tracking area update message overlap at least partly.

19. A network control node for detecting the point of attachment of mobile terminals moving within a mobile communication network in idle mode, wherein the mobile communication system can be logically divided into plural tracking areas to which the mobile terminals register, the network control node comprising:
   a processing unit and memory that maintain at a first network control entity context information for the respective mobile terminals in idle mode served by the first network control entity, wherein the context information for a respective mobile terminal comprises a marker that, when set, indicates that the respective mobile terminal has simultaneously registered to another tracking area than that controlled by the first network control entity,
   a transmitter that transmits a notification for verifying the current point of attachment of said marked mobile terminals, and
   a receiver that receives at the first network control entity information indicative of whether at least one marked mobile terminal in idle mode is currently attached to a radio access network within the tracking area controlled by the first network control entity,
   wherein the marker, when set, further indicates that the respective mobile terminal has registered to a Multimedia Broadcast Multicast Service (MBMS) service and wherein the notification is transmitted to the marked mobile terminal as part of a counting procedure for counting the mobile terminals in the cell that receive said service.

20. A mobile communication terminal for updating the mobile terminal's tracking area registration in a mobile communication system being logically divided into plural tracking areas, wherein mobile terminal is in idle mode and is registered to plural tracking areas simultaneously, the mobile terminal comprising:
   a transmitter that transmits from a mobile terminal to a network control entity controlling a tracking area attachment indication indicating to the network control entity controlling the tracking area that the mobile terminal is currently attached to the tracking area served by the network control entity,
   wherein the mobile terminal transmits the attachment indication in case the mobile terminal has recognized at least one cell change within said tracking area controlled by the network control entity or has not changed the tracking area for a given time period smaller than a time period for providing periodic tracking area updates,
   wherein the marker, when set, further indicates that the respective mobile terminal has registered to a Multimedia Broadcast Multicast Service (MBMS) service and wherein the notification is transmitted to the marked mobile terminal as part of a counting procedure for counting the mobile terminals in the cell that receive said service.

* * * * *